(12) United States Patent
Huang et al.

(10) Patent No.: US 12,321,680 B2
(45) Date of Patent: *Jun. 3, 2025

(54) INTEGRATED CIRCUIT FIN STRUCTURE

(71) Applicant: TAIWAN SEMICONDUCTOR MANUFACTURING COMPANY, LTD., Hsinchu (TW)

(72) Inventors: Po-Hsiang Huang, Hsinchu (TW); Fong-Yuan Chang, Hsinchu (TW); Clement Hsingjen Wann, Hsinchu (TW); Chih-Hsin Ko, Hsinchu (TW); Sheng-Hsiung Chen, Hsinchu (TW); Li-Chun Tien, Hsinchu (TW); Chia-Ming Hsu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,400

(22) Filed: Nov. 22, 2023

(65) Prior Publication Data

US 2024/0086612 A1 Mar. 14, 2024

Related U.S. Application Data

(60) Continuation of application No. 18/065,275, filed on Dec. 13, 2022, now Pat. No. 11,861,282, which is a
(Continued)

(51) Int. Cl.
*G06F 30/3312* (2020.01)
*G06F 30/367* (2020.01)
(Continued)

(52) U.S. Cl.
CPC ........ *G06F 30/392* (2020.01); *G06F 30/3312* (2020.01); *G06F 30/367* (2020.01);
(Continued)

(58) Field of Classification Search
CPC .. G06F 30/392; G06F 30/367; G06F 30/3312; G06F 30/398; G06F 2111/20;
(Continued)

(56) References Cited

U.S. PATENT DOCUMENTS 7,260,442 B2  8/2007  Hwang et al.
9,256,709 B2  2/2016  Yu et al.
(Continued)

FOREIGN PATENT DOCUMENTS

DE  102017125395  5/2018
JP  2004241529   8/2004
(Continued)

OTHER PUBLICATIONS

Office Action dated Oct. 25, 2020 for foreign patent case No. KR 10-20190137790. (pp. 1-7).
(Continued)

*Primary Examiner* — Ly D Pham
(74) *Attorney, Agent, or Firm* — Hauptman Ham, LLP

(57) ABSTRACT

An IC device includes first through third rows of fin field-effect transistors (FinFETs), wherein the second row is between and adjacent to each of the first and third rows, the FinFETs of the first row are one of an n-type or p-type, the FinFETs of the second and third rows are the other of the n-type or p-type, the FinFETs of the first and third rows include a first total number of fins, and the FinFETs of the second row include a second total number of fins one greater or fewer than the first total number of fins.

20 Claims, 12 Drawing Sheets

Related U.S. Application Data continuation of application No. 17/376,413, filed on Jul. 15, 2021, now Pat. No. 11,568,122, which is a division of application No. 16/599,552, filed on Oct. 11, 2019, now Pat. No. 11,080,453.

(60) Provisional application No. 62/753,259, filed on Oct. 31, 2018.

(51) Int. Cl.

| | |
|---|---|
| *G06F 30/392* | (2020.01) |
| *G06F 30/398* | (2020.01) |
| *H01L 21/8238* | (2006.01) |
| *H01L 27/092* | (2006.01) |
| *H01L 29/66* | (2006.01) |
| *H01L 29/78* | (2006.01) |
| *H10D 30/01* | (2025.01) |
| *H10D 30/62* | (2025.01) |
| *H10D 84/01* | (2025.01) |
| *H10D 84/03* | (2025.01) |
| *H10D 84/85* | (2025.01) |
| *G06F 111/20* | (2020.01) |

(52) U.S. Cl.
CPC ......... *G06F 30/398* (2020.01); *H10D 30/024* (2025.01); *H10D 30/62* (2025.01); *H10D 84/0193* (2025.01); *H10D 84/038* (2025.01); *H10D 84/853* (2025.01); *G06F 2111/20* (2020.01)

(58) Field of Classification Search
CPC ......... H01L 21/823821; H01L 27/0924; H01L 29/66795; H01L 29/785
USPC ....................................................... 257/288
See application file for complete search history.

(56) References Cited

U.S. PATENT DOCUMENTS

| | | | |
|---|---|---|---|
| 9,397,104 B2* | 7/2016 | Zhu | ............ H10D 86/215 |
| 9,679,994 B1 | 6/2017 | Chou et al. | |
| 9,837,437 B2 | 12/2017 | Baek et al. | |
| 9,852,251 B2 | 12/2017 | Lu et al. | |
| 10,283,621 B2 | 5/2019 | Xie et al. | |
| 10,475,791 B1 | 11/2019 | Zang et al. | |
| 11,462,629 B2 | 10/2022 | Tanzawa | |
| 2004/0153986 A1 | 8/2004 | Sahara et al. | |
| 2006/0098469 A1 | 5/2006 | Yang et al. | |
| 2009/0083681 A1 | 3/2009 | Mccoo et al. | |
| 2009/0321850 A1 | 12/2009 | Griebenow et al. | |
| 2013/0181184 A1 | 7/2013 | Sakuma et al. | |
| 2013/0307088 A1 | 11/2013 | Yang et al. | |
| 2014/0040838 A1 | 2/2014 | Liu et al. | |
| 2014/0119103 A1 | 5/2014 | Lee et al. | |
| 2014/0131765 A1* | 5/2014 | Tsai | ............ H01L 29/7391 257/133 |
| 2015/0278429 A1 | 10/2015 | Chang | |
| 2016/0055283 A1 | 2/2016 | Oh et al. | |
| 2016/0055285 A1 | 2/2016 | Baek et al. | |
| 2017/0098582 A1 | 4/2017 | Mn et al. | |
| 2017/0323047 A1 | 11/2017 | Hsu et al. | |
| 2017/0345809 A1 | 11/2017 | Chang et al. | |
| 2017/0358565 A1 | 12/2017 | Hensel et al. | |
| 2018/0075182 A1 | 3/2018 | Zhuang et al. | |
| 2018/0150592 A1 | 5/2018 | Chang et al. | |
| 2018/0151553 A1 | 5/2018 | Liaw | |
| 2018/0210421 A1 | 7/2018 | Kim et al. | |
| 2019/0164949 A1 | 5/2019 | Sio et al. | |
| 2019/0287967 A1 | 9/2019 | Liaw | |
| 2019/0355719 A1 | 11/2019 | Maeda et al. | |
| 2020/0006318 A1 | 1/2020 | Lin et al. | |
| 2020/0043797 A1 | 2/2020 | Chen et al. | |
| 2020/0357786 A1 | 11/2020 | Sio et al. | |
| 2021/0110879 A1* | 4/2021 | Chang | ............ G11C 17/16 |

FOREIGN PATENT DOCUMENTS

| | | |
|---|---|---|
| JP | 2012227256 | 11/2012 |
| KR | 20180061058 | 6/2018 |
| TW | 201640655 | 11/2016 |
| TW | 201834186 | 9/2018 |
| TW | 201837994 | 10/2018 |

OTHER PUBLICATIONS

Office Action dated Jul. 31, 2020 from corresponding application No. TW 108139109.

Office Action dated Mar. 3, 2021 for corresponding case No. DE 10 2019 128 996.3 (pp. 1-82).

* cited by examiner

400

| Step | Description |
|---|---|
| 410 | Arrange a first plurality of fin tracks into a first subset having a first number of fin tracks corresponding to a first type, and a second subset having a second number of fin tracks corresponding to a second type, the first number being greater than the second number |
| 420 | Arrange a second plurality of fin tracks into a first subset having the first number of fin tracks corresponding to the second type, and a second subset having the second number of fin tracks corresponding to the first type |
| 430 | Abut the second subset of the first plurality of fin tracks with the first subset of the second plurality of fin tracks |
| 440 | Align a third plurality of fin tracks with one of the first plurality of fin tracks or the second plurality of fin tracks |
| 450 | Align a cell with one of the first plurality of fin tracks, the second plurality of fin tracks, or the third plurality of fin tracks based on a cell type |
| 160 | Generate and store the IC layout diagram in a storage device |
| 170 | Fabricate a semiconductor mask or component based on the IC layout diagram |
| 180 | Perform one or more manufacturing operations based on the IC layout diagram |

FIG. 4

INTEGRATED CIRCUIT FIN STRUCTURE

PRIORITY CLAIM

The present application is a continuation of U.S. application Ser. No. 18/065,275, filed Dec. 13, 2022, now U.S. Pat. No. 11,861,282, issued Jan. 2, 2024, which is a continuation of U.S. application Ser. No. 17/376,413, filed Jul. 15, 2021, now U.S. Pat. No. 11,568,122, issued Jan. 21, 2023, which is a divisional of U.S. application Ser. No. 16/599,552, filed Oct. 11, 2019, now U.S. Pat. No. 11,080,453, issued Aug. 3, 2021, which claims the priority of U.S. Provisional Application No. 62/753,259, filed Oct. 31, 2018, each of which is incorporated herein by reference in its entirety.

BACKGROUND

An integrated circuit (IC) typically includes a number of semiconductor devices otherwise known as IC devices. One way to represent an IC device is with a plan view diagram referred to as a layout diagram, or IC layout diagram. An IC layout diagram is hierarchical and includes modules which carry out high-level functions in accordance with the IC device's design specifications. The modules are often built from a combination of cells that can include both standard and custom cells, each of which represents one or more semiconductor structures.

Cells are configured to provide common, low-level functions, often performed by transistors based on gate regions that intersect active regions, sometimes known as oxide definition (OD) regions. The elements of a cell are arranged within a cell boundary and electrically connected to other cells through interconnect structures.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a flowchart of a method of operating an IC manufacturing system, in accordance with some embodiments.

DETAILED DESCRIPTION

Figure 1:
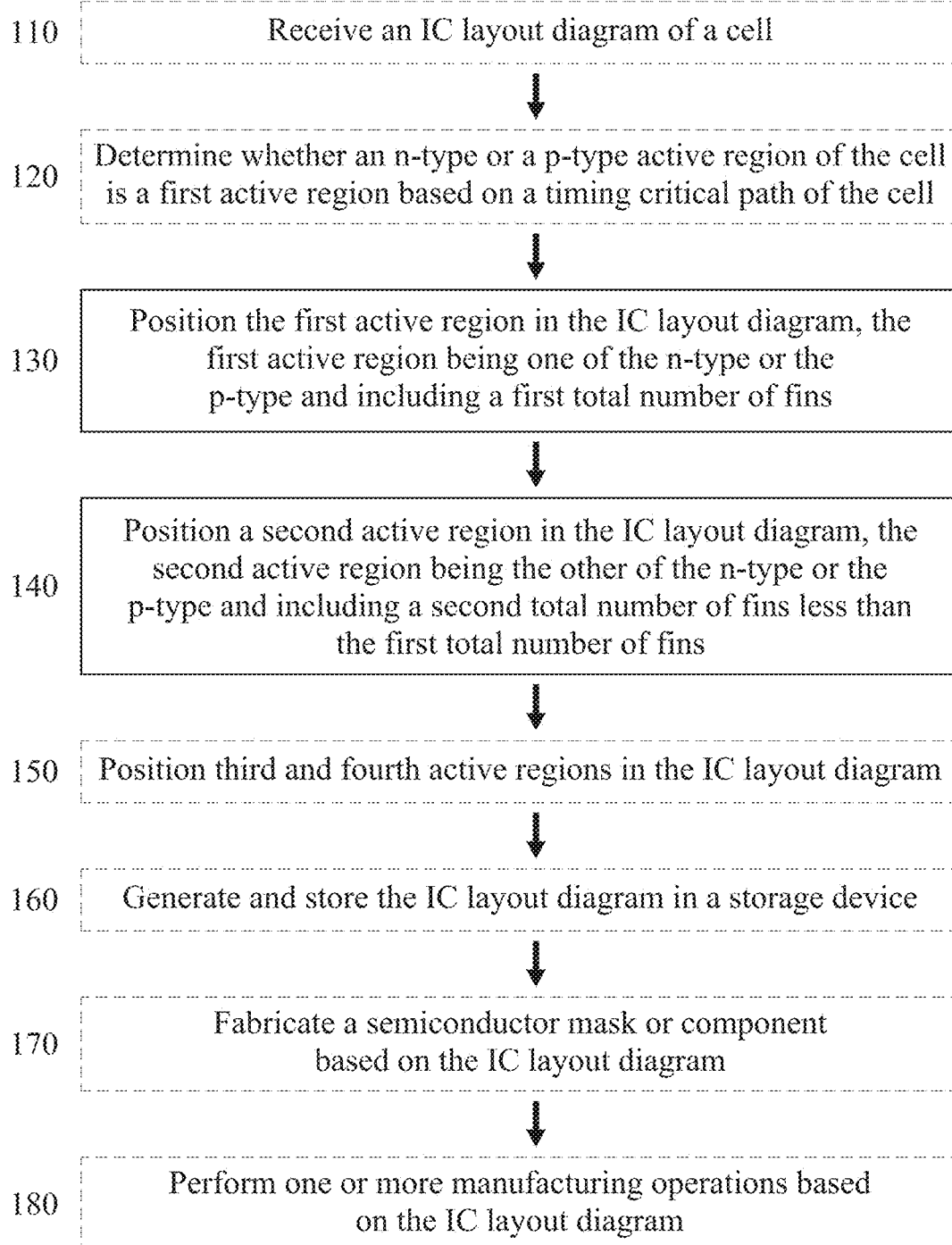
FIG. 1 is a flowchart of a method of operating an IC manufacturing system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a method, system, and structure correspond to an IC layout diagram of a cell including fin, field-effect transistors (FinFETs) having differing numbers of fins. For a given cell height, including at least one FinFET having a greater number of fins than at least one other FinFET increases a driving ability of the associated IC device compared to approaches in which each FinFET of a cell includes a same number of fins. In some embodiments, the IC layout diagram includes a fin track arrangement configured to support placement of a variety of cells, including those with FinFETs having differing numbers of fins, thereby enabling the increased driving ability of multiple cells compared to approaches that do not include fin track arrangements configured to support placement of cells with FinFETs having differing numbers of fins.

FIG. 1 is a flowchart of a method 100 of operating an IC manufacturing system, in accordance with some embodiments. In some embodiments, operating the IC manufacturing system includes generating an IC layout diagram, e.g., an IC layout diagram 200 or 300 discussed below with respect to FIGS. 2 and 3, corresponding to an IC structure, e.g., an IC structure 900 discussed below with respect to FIG. 9, manufactured based on the generated IC layout diagram as part of an IC device. Non-limiting examples of IC devices include memory circuits, logic devices, processing devices, signal processing circuits, or the like.

In some embodiments, some or all of method 100 is executed by a processor of a computer. In some embodiments, some or all of method 100 is executed by a processor 1102 of an IC layout diagram generation system 1100, discussed below with respect to FIG. 11.

Some or all of the operations of method 100 are capable of being performed as part of a design procedure performed in a design house, e.g., a design house 1220 discussed below with respect to FIG. 12.

In some embodiments, the operations of method 100 are performed in the order depicted in FIG. 1. In some embodiments, the operations of method 100 are performed simultaneously and/or in an order other than the order depicted in FIG. 1. In some embodiments, one or more operations are performed before, between, during, and/or after performing one or more operations of method 100.

Figure 2:
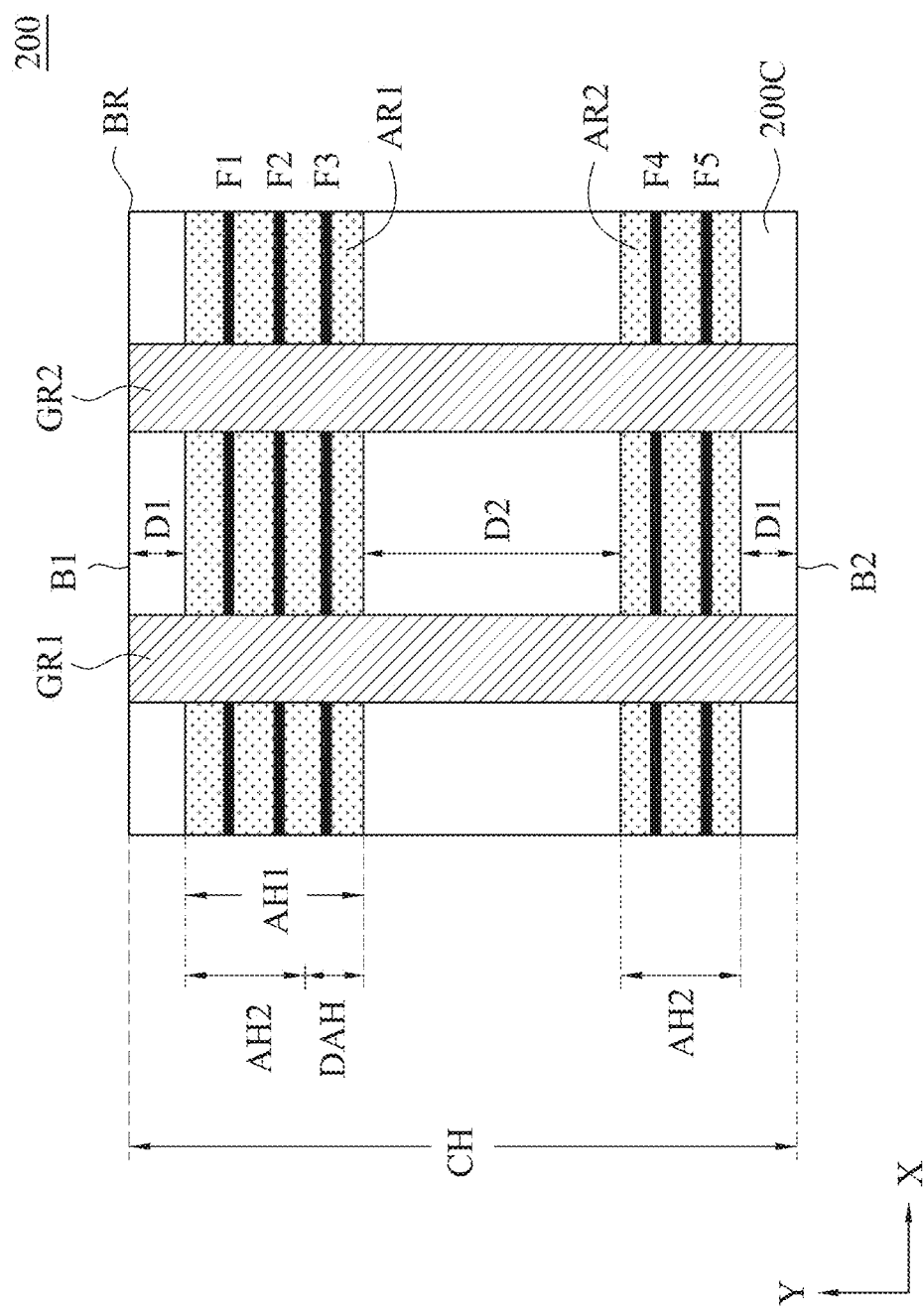
FIG. 2 depicts an IC layout diagram, in accordance with some embodiments.
Figure 3:
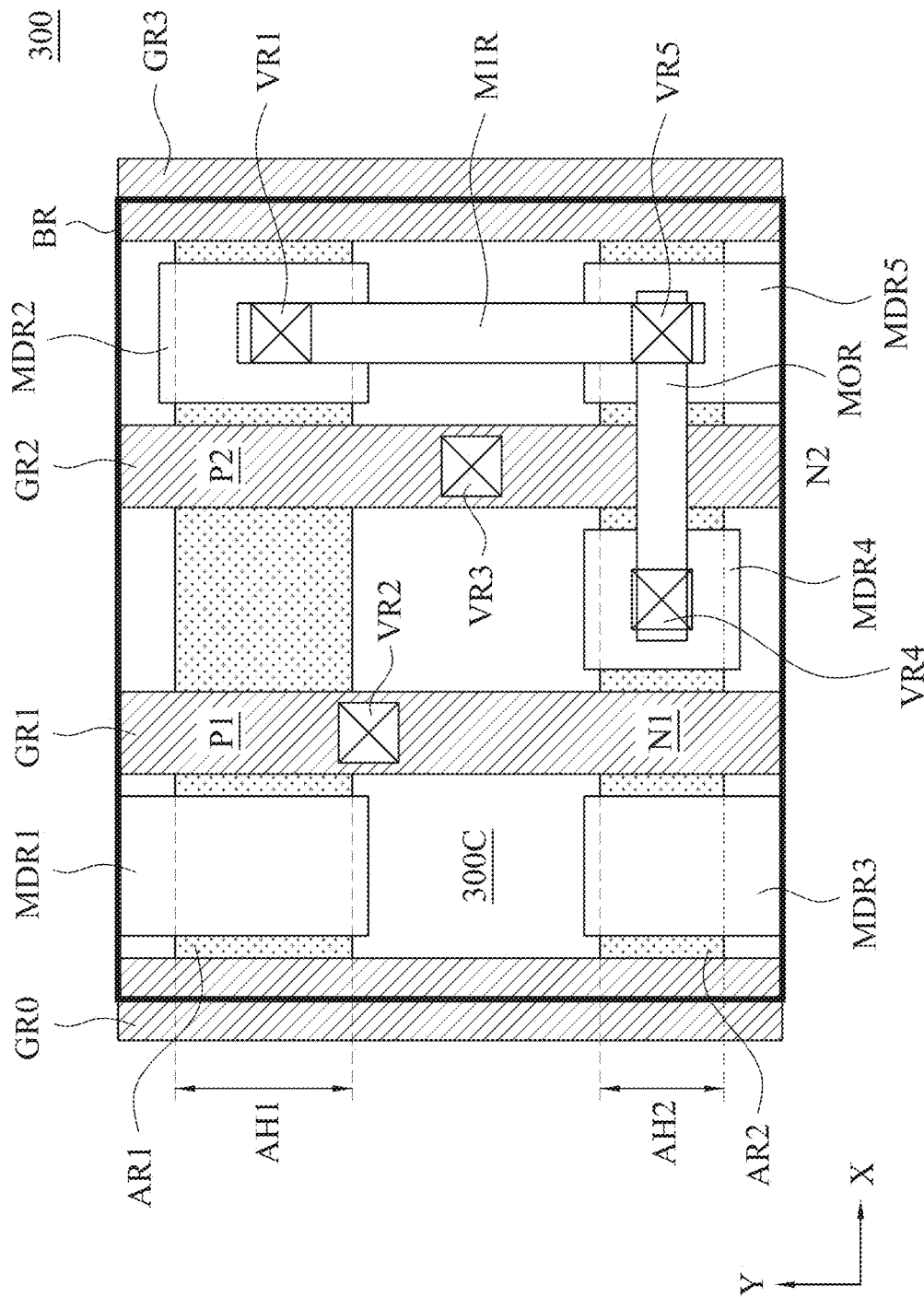
FIG. 3 depicts an IC layout diagram, in accordance with some embodiments.

FIGS. 2 and 3 are depictions of non-limiting examples of respective IC layout diagrams 200 and 300 generated by executing one or more operations of method 100 as discussed below, in some embodiments. IC layout diagrams 200 and 300 are simplified for the purpose of illustration. In various embodiments, one or more of IC layout diagrams 200 and 300 includes features in addition to those depicted in FIGS. 2 and 3, e.g., one or more transistor elements, power rails, isolation structures, wells, conductive elements, or the like.

Each of FIGS. 2 and 3 further depicts an X direction and a Y direction perpendicular to the X direction. The X direction being depicted as horizontal with respect to the page and the Y direction being depicted as vertical are a non-limiting example for the purpose of illustration. In various embodiments, the X and Y directions are perpendicular to each other and have orientations other than those depicted in FIGS. 2 and 3.

The X direction includes a positive X direction depicted in FIGS. 2 and 3 and a negative X direction (not labeled) opposite to the positive X direction. The Y direction includes a positive Y direction depicted in FIGS. 2 and 3 and a negative Y direction (not labeled) opposite to the positive Y direction.

At operation 110, in some embodiments, an IC layout diagram of a cell is received. In some embodiments, receiving the IC layout diagram of the cell is referred to as receiving the cell. In some embodiments receiving the IC layout diagram of the cell is part of receiving one or more IC layout diagrams of a plurality of cells.

In various embodiments, receiving the IC layout diagram of the cell includes receiving the IC layout diagram of a standard cell, a custom cell, an engineering change order (ECO) cell, a logic gate cell, a memory cell, or another type of cell or combination of cells capable of being defined in an IC layout diagram. In various embodiments, a logic gate cell includes one or more of an AND, OR, NAND, NOR, XOR, INV, AND-OR-Invert (AOI), OR-AND-Invert (OAI), MUX, flip-flop, BUFF, latch, delay, or clock device. In various embodiments, a memory cell includes one or more of a static random access memory (SRAM), a dynamic RAM (DRAM), a resistive RAM (RRAM), a magnetoresistive RAM (MRAM), or read only memory (ROM) cell, or another device capable of having multiple states representative of logical values.

Receiving the IC layout diagram of the cell includes receiving the cell including a pair of active regions. An active region, e.g., an active region AR1 or AR2 discussed below with respect to FIGS. 2 and 3, is a region in an IC layout diagram included in a manufacturing process as part of defining an active area, also referred to as an oxide diffusion or definition (OD) in some embodiments, in a semiconductor substrate.

An active area is a continuous section of the semiconductor substrate having either n-type or p-type doping that includes various semiconductor structures, including one or more fins of a FinFET in some embodiments. In various embodiments, an active area is located within a well, i.e., either an n-well or a p-well, within the semiconductor substrate and/or is electrically isolated from other elements in the semiconductor substrate by one or more isolation structures, e.g., one or more shallow trench isolation (STI) structures.

A fin is a raised, elongated portion of an active area extending in a first direction including one or more of an elementary semiconductor, e.g., silicon (Si) or germanium (Ge), a compound semiconductor, e.g., silicon germanium (SiGe), silicon carbide (SiC), gallium arsenide (GaAs), gallium phosphide (GaP), indium phosphide (InP), indium arsenide (InAs), or indium antimonide (ISb), or an alloy semiconductor, e.g., GaAsP, AlInAs, AlGaAs, GaInAs, GaInP, or GaInAsP, or the like.

In some embodiments, an active area includes one or more source/drain (S/D) structures corresponding to one or more S/D regions within the active region used to define the active area. An S/D structure is a semiconductor structure within an active area, adjacent to or including portions of the one or more fins, and configured to have a doping type opposite to that of other portions of the active area. In some embodiments, an S/D structure is configured to have lower resistivity than other portions of the active area, e.g., by including one or more portions having doping concentrations greater than one or more doping concentrations otherwise present throughout the active area. In various embodiments, S/D structures include epitaxial regions of a semiconductor material, e.g., Si, SiGe, and/or SiC.

In some embodiments, receiving the IC layout diagram of the cell includes receiving the IC layout diagram including one or more of a gate region, a metal-like defined (MD) region, a conductive region, or a via region.

A gate region, e.g., one of gate regions GR0-GR3 depicted in FIGS. 2 and/or 3, is a region in an IC layout diagram included in a manufacturing process as part of defining a gate structure overlying the semiconductor substrate. In the non-limiting examples depicted in FIGS. 2 and 3, gate regions GR0-GR3 have an orientation along the Y direction.

As indicated in FIG. 3, in some cases, a location at which a gate region intersects an active region in an IC layout diagram corresponds to a transistor, e.g., one of transistors P1, P2, N1, or N2, in the corresponding IC structure that includes the portion of the corresponding gate structure overlying the corresponding active area, portions of the active area below and partially surrounded by the gate structure, and S/D structures adjacent to the gate structure. In other cases, a gate region, e.g., one of gate regions GR0 or GR3, intersects an active region, e.g., one of active regions AR1 or AR2 at a location that does not correspond to a transistor, and the corresponding gate structure is referred to as a dummy gate structure in some embodiments.

A gate structure is a volume including one or more conductive segments including one or more conductive materials, e.g., polysilicon, one or more metals, and/or one or more other suitable materials, substantially surrounded by one or more insulating materials, e.g., silicon dioxide and/or one or more other suitable materials, the one or more conductive segments thereby being configured to control a voltage provided to underlying and adjacent dielectric layers. In various embodiments, a dielectric layer includes one or more of silicon dioxide and/or a high-k dielectric material, e.g., a dielectric material having a k value higher than 3.8 or 7.0. In some embodiments, a high-k dielectric material includes aluminum oxide, hafnium oxide, lanthanum oxide, or another suitable material.

An MD region, e.g., one of MD regions MDR1-MDR5 depicted in FIG. 3, is a conductive region in an IC layout diagram included in a manufacturing process as part of defining an MD segment in and/or on a semiconductor substrate. In the non-limiting examples depicted in FIG. 3, MD regions MDR1-MDR5 have an orientation along the Y direction.

In some embodiments, an MD segment includes a portion of at least one metal layer, e.g., a contact layer, overlying and contacting the substrate and having a thickness sufficiently small to enable formation of an insulation layer between the MD segment and an overlying metal layer, e.g., a metal zero layer. In various embodiments, an MD segment includes one or more of copper (Cu), silver (Ag), tungsten (W), titanium (Ti), nickel (Ni), tin (Sn), aluminum (Al) or another metal or material suitable for providing a low resistance electrical connection between IC structure elements, i.e., a resistance level below a predetermined threshold corresponding to one or more tolerance levels of a resistance-based effect on circuit performance.

In various embodiments, an MD segment includes a section of the semiconductor substrate and/or an epitaxial layer having a doping level, e.g., based on an implantation process, sufficient to cause the segment to have the low resistance level. In various embodiments, a doped MD segment includes one or more of silicon (Si), silicon-germanium (SiGe), silicon-carbide (SiC), boron (B), phosphorous (P), arsenic (As), gallium (Ga), a metal as discussed above, or another material suitable for providing the low resistance level. In some embodiments, an MD segment includes a dopant having a doping concentration of about $1*10^{16}$ per cubic centimeter ($cm^{-3}$) or greater.

In various embodiments, one or more MD regions, e.g., one or more of MD regions MDR1-MDR5, overlaps one or more active regions, e.g., one or both of active regions AR1 or AR2, and the corresponding one or more MD segments includes at least a portion within the corresponding one or more active areas. In various embodiments, one or more MD segments abuts or includes some or all of one or more S/D structures in the corresponding one or more active areas.

A conductive region, e.g., one of conductive regions M0R or M1R depicted in FIG. 3, is a conductive region in an IC layout diagram included in a manufacturing process as part of defining a segment of a conductive layer of the manufacturing process.

A conductive segment, e.g., a polysilicon, metal zero, metal one, or metal two segment, is a portion of a corresponding polysilicon or metal layer, e.g., a metal zero, metal one, or metal two layer, that includes one or more of polysilicon, copper (Cu), silver (Ag), tungsten (W), titanium (Ti), nickel (Ni), tin (Sn), aluminum (Al) or another metal or material suitable for providing a low resistance electrical connection between IC structure elements.

A via region, e.g., one of via regions VR1-VR5 depicted in FIG. 3, is a region in an IC layout diagram included in a manufacturing process as part of defining a via structure configured to provide a low resistance electrical connection between conductive segments in two or more levels and/or layers of the manufacturing process. Via structures include one or more of copper (Cu), silver (Ag), tungsten (W), titanium (Ti), nickel (Ni), tin (Sn), aluminum (Al) or another metal or material suitable for providing low resistance electrical connections between IC structure layers.

Receiving the IC layout diagram of the cell includes receiving the active regions of the pair of active regions corresponding to different ones of the n-type or p-type doping. In some embodiments, receiving the active regions includes receiving each of the pair of active regions configured to define a same number of fins of one or more FinFETs extending in the first direction. In various embodiments, receiving the IC layout diagram of the cell includes receiving each of the pair of active regions configured to define one, two, or three fins of one or more FinFETs.

In some embodiments, receiving each of the pair of active regions configured to define a same number of fins includes receiving each of the pair of active regions having a same height in a cell height direction perpendicular to the first direction. In some embodiments, receiving each of the pair of active regions having the same height includes receiving each of the pair of active regions having a height AH2 discussed below with respect to FIGS. 2 and 3.

In some embodiments, receiving the IC layout diagram of the cell includes receiving the IC layout diagram of the cell from a cell library, i.e., a database or collection of electronic files configured to store and provide access to a plurality of IC layout diagrams of various cells. In some embodiments, receiving the IC layout diagram of the cell includes receiving the IC layout diagram of the cell from a cell library 1120 of IC layout generation system 1100, discussed below with respect to FIG. 11.

In some embodiments, receiving the IC layout diagram of the cell includes receiving one or more electronic files containing data usable by an IC manufacturing system as part of an IC manufacturing flow, e.g., IC manufacturing system 1200 discussed below with respect to FIG. 12.

At operation 120, in some embodiments, the n-type or p-type active region of the cell is determined to be the first active region, discussed below with respect to operation 130. Determining whether the n-type or p-type active region is the first active region is based on a timing critical path of the cell. In some embodiments, the n-type active region is determined to be the first active region if the timing critical path includes one or more n-type transistors having a significant effect on timing-related cell performance, or the p-type active region is determined to be the first active region if the timing critical path includes one or more p-type transistors having a significant effect on timing-related cell performance. The significance of an effect on timing-related cell performance is based on one or more predetermined criteria, e.g., rise time, fall time, switching speed, circuit bandwidth, or the like.

In various embodiments, determining whether the n-type or p-type active region is the first active region is performed by receiving user input and/or by executing one or more algorithms, e.g., one or more circuit simulations, based on a layout design corresponding to the IC layout diagram of the cell.

In various embodiments, determining whether the n-type or p-type active region is the first active region is based on one or more manufacturing recipe parameters, one or more circuit performance specifications, and/or one or more circuit configuration criteria, e.g., parallel or series transistor arrangements.

At operation 130, the first active region is positioned along the cell height direction in the IC layout diagram, the first active region being one of the n-type or the p-type and including a first total number of fins. In some embodiments, positioning the first active region in the IC layout diagram is performed in conjunction with positioning the second active region in the IC layout diagram as discussed below with respect to operation 140.

In some embodiments, positioning the first active region in the IC layout diagram includes positioning the first active region in the IC layout diagram of the cell received in operation 110. In some embodiments, positioning the first active region in the IC layout diagram includes creating a new IC layout diagram of a cell and positioning a newly created first active region in the newly created IC layout diagram of the cell.

In some embodiments, positioning the first active region in the IC layout diagram includes positioning the first active region determined by performing operation 120. In some embodiments, positioning the first active region in the IC layout diagram includes positioning an active region otherwise designated as the first active region, e.g., based on a user input.

The first active region including the first total number of fins includes the first active region having a predetermined total number of fins. The predetermined total number of fins included in a given active region is based on various manufacturing design criteria, e.g., a combination of IC feature sizes and circuit performance specifications. In various embodiments, the predetermined total number of fins included in the first active region is equal to two, three, or four fins.

Positioning the first active region includes positioning the first active region having a first height in the cell height direction. In some embodiments, positioning the first active region having the first height includes the first height corresponding to the first total number of fins.

In some embodiments, positioning the first active region having the first height includes increasing a height of an active region of the IC layout diagram received in operation 110 along the cell height direction. In some embodiments, positioning the first active region having the first height includes defining the first height of a newly created first active region in a newly created IC layout diagram of the cell in the cell height direction.

In some embodiments, positioning the first active region includes positioning the first active region a first distance from a first cell border segment along the cell height direction. In some embodiments, positioning the first active region the first distance from the first cell border segment includes the first distance being greater than or equal to a first minimum spacing rule. In some embodiments, the first minimum spacing rule defines a minimum separation distance between an active region and a cell border in a given manufacturing recipe. Positioning the first active region the first distance from the first cell border segment is further discussed below with respect to operation 140.

FIG. 2 depicts IC layout diagram 200 of a cell 200C including a boundary BR, a cell height CH in the Y direction, active region AR1 including fins F1-F3 extending in the X direction, active region AR2 including fins F4 and F5 extending in the X direction, and gate regions GR1 and GR2 extending in the Y direction and intersecting each of active regions AR1 and AR2, thereby defining, at least in part, one or more transistors (not labeled) of cell 200C. In various embodiments, active region AR1 is a p-type active region and active region AR2 is an n-type active region, or active region AR1 is an n-type active region and active region AR2 is a p-type active region. In various embodiments, cell 200C has a configuration, e.g., a logic gate, that includes one or more features, e.g., MD, via, and/or conductive regions, in addition to those depicted in FIG. 2 that are not shown for the purpose of illustration.

In some embodiments, positioning the first active region in the IC layout diagram includes positioning active region AR1, including three fins F1-F3 and having a height AH1 in the Y direction, a distance D1 along the Y direction from a border segment B1 of border BR of cell 200C, as further discussed below with respect to operation 140.

FIG. 3 depicts IC layout diagram 300 of a cell 300C including boundary BR, p-type active region AR1 including fins F1-F3 (not shown in FIG. 3), n-type active region AR2 including fins F4 and F5 (not shown in FIG. 3), gate regions GR0-GR3 intersecting each of active regions AR1 and AR2, MD regions MDR1-MDR5, via regions VR1-VR5, and conductive regions M0R and M1R.

P-type transistor P1 includes gate region GR1, the portion of active region AR1 overlapped by gate region GR1, and S/D regions (not labeled) of active region AR1 adjacent to gate region GR1; p-type transistor P2 includes gate region GR2, the portion of active region AR1 overlapped by gate region GR2, and S/D regions (not labeled) of active region AR1 adjacent to gate region GR2; n-type transistor N1 includes gate region GR1, the portion of active region AR2 overlapped by gate region GR1, and S/D regions (not labeled) of active region AR2 adjacent to gate region GR1; and n-type transistor N2 includes gate region GR2, the portion of active region AR2 overlapped by gate region GR2, and S/D regions (not labeled) of active region AR2 adjacent to gate region GR2.

Gate region GR1 overlaps the portion of active region AR1 corresponding to transistor P1, the portion of active region AR2 corresponding to transistor N1, and via region VR2, thereby partially defining an input node (not otherwise shown) configured to be electrically connected through a via defined by via region VR2. Gate region GR2 overlaps the portion of active region AR1 corresponding to transistor P2, the portion of active region AR2 corresponding to transistor N2, and via region VR3, thereby partially defining an input node (not otherwise shown) configured to be electrically connected through a via defined by via region VR3.

MD region MDR1 overlaps an S/D region of active region AR1 between gate regions GR0 and GR1 and corresponding to transistor P1, thereby partially defining a conductive path (not otherwise shown) between transistor P1 and a power supply voltage source (not shown). The S/D region of active region AR1 between gate regions GR1 and GR2 is shared by transistors P1 and P2, thereby defining a series connection between transistors P1 and P2.

The S/D region of active region AR1 between gate regions GR2 and GR3 and corresponding to transistor P2 is overlapped by MD region MDR2, via region VR1, and conductive region M1R. Conductive region M1R also overlaps via region VR5 and conductive region M0R, which overlaps via region VR4, MD region MDR4, and the S/D region of active region AR2 between gate regions GR1 and GR2 shared by transistors N1 and N2. MD regions MDR2 and MDR4, via regions VR2, VR4, and VR5, and conductive regions M0R and M1R thereby partially define an output node (not otherwise shown) including transistors P2, N1, and N2 and configured to be electrically connected through a metal segment defined by conductive region M1R.

MD region MDR3 overlaps an S/D region of active region AR2 between gate regions GR0 and GR1 and corresponding to transistor N1, thereby partially defining a conductive path (not otherwise shown) between transistor N1 and a power supply voltage, or ground, reference (not shown). MD region MDR5 overlaps an S/D region of active region AR2 between gate regions GR2 and GR3 and corresponding to transistor N2, thereby partially defining a conductive path (not otherwise shown) between transistor N2 and the power supply voltage reference.

By the configuration depicted in FIG. 3 and discussed above, IC layout diagram 300 of cell 300C corresponds to a NOR gate including gates of transistors P1 and N1 arranged as a first input, gates of transistors P2 and N2 arranged as a second input, transistors P1 and P2 connected in series between the power supply voltage and the output node, and transistors N1 and N2 connected in parallel between the output node and the power supply voltage reference.

In some embodiments, positioning the first active region in the IC layout diagram includes positioning active region AR1 having height AH1 in cell 300C, as further discussed below with respect to operation 140.

At operation 140, a second active region is positioned along the cell height direction in the IC layout diagram, the second active region being the other of the n-type or the p-type and including a second total number of fins less than the first total number of fins. In some embodiments, positioning the second active region in the IC layout diagram is performed in conjunction with positioning the first active region in the IC layout diagram as discussed above with respect to operation 130.

In some embodiments, positioning the second active region in the IC layout diagram includes positioning the second active region in the IC layout diagram of the cell received in operation 110. In some embodiments, positioning the second active region in the IC layout diagram includes positioning a newly created second active region in the IC layout diagram of the cell newly created in operation 130.

In some embodiments, positioning the second active region in the IC layout diagram includes positioning the second active region determined along with determining the first active region by performing operation 120. In some embodiments, positioning the second active region in the IC layout diagram includes positioning an active region otherwise designated as the second active region, e.g., based on a user input.

The second active region including the second total number of fins includes the second active region having a predetermined total number of fins. The predetermined total number of fins included in the second active region is less than the predetermined total number of fins included in the first active region. In some embodiments, a difference between the predetermined numbers of fins in the first and second active regions is equal to one. In various embodiments, the predetermined total number of fins included in the second active region is equal to one, two, or three fins.

Positioning the second active region includes positioning the second active region having a second height in the cell height direction smaller than the first height of the first active region. In some embodiments, positioning the second active region having the second height includes the second height corresponding to the second total number of fins.

In some embodiments, positioning the second active region having the second height includes maintaining a height of an active region of the IC layout diagram received in operation 110. In some embodiments, positioning the second active region having the second height includes defining the second height in the cell height direction of a newly created second active region in the IC layout diagram of the cell newly created in operation 130.

In some embodiments, positioning the second active region includes positioning the second active region a second distance along the cell height direction from a second cell border segment opposite the first cell border segment. In some embodiments, positioning the second active region the second distance from the second cell border segment includes the second distance being greater than or equal to the first minimum spacing rule. In some embodiments, positioning the second active region the second distance from the second cell border segment includes the second distance being equal to the first distance between the first active region and the first cell border segment discussed above with respect to operation 130.

In some embodiments, one or both of positioning the first active region as discussed in operation 130 or positioning the second active region includes separating the first and second active regions by a third distance along the cell height direction. In some embodiments, separating the first and second active regions by the third distance includes the third distance being greater than or equal to a second minimum spacing rule. In some embodiments, the second minimum spacing rule defines a minimum separation distance between adjacent active regions in a given manufacturing recipe.

In some embodiments, a combination of the first and second active regions having the respective first and second heights, positioning the first active region the first distance from the first cell border segment, positioning the second active region the second distance from the second cell border segment, and separating the first and second active regions by the third distance includes a sum of the first and second heights and the first through third distances being equal to a height of the cell.

In some embodiments, positioning the second active region in the IC layout diagram includes positioning active region AR2, having height AH2 in the Y direction corresponding to two fins F4 and F5, distance D1 along the Y direction from a border segment B2 of border BR in IC layout diagram 200 of cell 200C depicted in FIG. 2. In some embodiments, positioning one or both of the first or second active regions includes positioning one or both of active regions AR1 or AR2 separated by a distance D2 along the Y direction such that a sum of heights AH1 and AH2 and distances D1 (2×) and D2 is equal to cell height CH as depicted in FIG. 2.

In some embodiments, distance D1 and/or the first minimum spacing rule have one or more values ranging from 10 nanometers (nm) to 50 nm. In some embodiments, distance D1 and/or the first minimum spacing rule have one or more values ranging from 25 nm to 40 nm.

In some embodiments, distance D2 and/or the second minimum spacing rule have one or more values ranging from 20 nm to 120 nm. In some embodiments, distance D2 and/or the second minimum spacing rule have one or more values ranging from 50 nm to 100 nm.

In some embodiments, height AH1 has a value ranging from 30 nm to 100 nm. In some embodiments, height AH1 has a value ranging from 45 nm to 85 nm.

In some embodiments, height AH2 has a value ranging from 20 nm to 65 nm. In some embodiments, height AH2 has a value ranging from 35 nm to 50 nm.

In some embodiments, height CH has a value ranging from 100 nm to 400 nm. In some embodiments, height CH has a value ranging from 200 nm to 300 nm.

In the embodiment depicted in FIG. 2, distance D1 is equal to the first minimum spacing rule, distance D2 is greater than or equal to the second minimum spacing rule, and height AH1 is greater than height AH2 by a height difference DAH. In some embodiments, height difference DAH has a value ranging from 5 nm to 50 nm. In some embodiments, height difference DAH has a value ranging from 10 nm to 35 nm.

Height difference DAH thereby represents a difference between distance D2 and a larger distance D2+DAH that would otherwise separate active regions AR1 and AR2 if each of active regions AR1 and AR2 were to have height AH2 corresponding to two fins.

Conversely, if each of active regions AR1 and AR2 were to have height AH1 corresponding to three fins, height difference DAH would represent the difference between distance D2 and a shorter distance D2−DAH that would otherwise separate active regions AR1 and AR2. In the embodiment depicted in FIG. 2, the shorter distance D2−DAH is less than the second minimum spacing rule such that positioning each of active regions AR1 and AR2 having height AH1 in cell 200C is not possible without violating the first or second minimum spacing rule and/or increasing cell height CH.

In the embodiment depicted in FIG. 2, the first and second minimum spacing rules, heights AH1 and AH2, cell height CH, and distances D1 and D2 are thereby related such that, for the given cell height CH, the total number of five fins (fins F1-F3 in active region AR1 plus fins F4 and F5 in active region AR2) is a maximum total number of fins capable of being included in regions AR1 and AR2 positioned in IC layout diagram 200 of cell 200C in operations 130 and 140.

In various embodiments, cells other than cell 200C are similarly based on minimum spacing rules and include heights and distances configured such that, for a given cell height, maximum total numbers of three, five, or seven fins are capable of being included in first and second active regions positioned in IC layout diagrams of the cells in operations 130 and 140.

In some embodiments, positioning the second active region in the IC layout diagram includes positioning active region AR2 having height AH2 in IC layout diagram 300 of cell 300C depicted in FIG. 3. Positioning active region AR2 having height AH2 in IC layout diagram 300 of cell 300C corresponds to each of n-type transistors N1 and N2 including a total of two fins, and positioning active region AR1 having height AH1 in IC layout diagram 300 of cell 300C in operation 130 corresponds to each of p-type transistors P1 and P2 including a total of three fins.

In the embodiment depicted in FIG. 3, p-type transistors P1 and P2 are part of a timing critical path of the NOR gate corresponding to IC layout diagram 300 of cell 300C. Transistors P1 and P2 are thereby capable of having an increased driving current compared to approaches in which p-type transistors of a NOR gate include fewer fins. In some embodiments, by including three fins in transistors P1 and P2, the NOR gate corresponding to IC layout diagram 300 of cell 300C has a switching speed increase of 10-12% compared to an approach in which similarly arranged p-type transistors include two fins.

In various embodiments, IC layout diagrams of cells other than cell 300C corresponding to a NOR gate, e.g., cells corresponding to other NOR gate arrangements or NAND, OAI, AOI, or other logic gates, are otherwise configured such that one or more transistors in a timing critical path are capable of having increased driving current compared to approaches in which the one or more transistors have relatively fewer fins.

At operation 150, in some embodiments, third and fourth active regions are positioned in the cell along the cell height direction. Positioning the third active region includes positioning the third active region being the same type as the second active region and including a total number of fins the same as the total number of fins in the first active region. Positioning the fourth active region includes positioning the fourth active region being the same type as the first active region and including a total number of fins the same as the total number of fins in the second active region. Positioning the third and fourth active regions includes positioning the third active region between the second and fourth active regions.

Because the first and fourth active regions are a same type, the second and third active regions are a same type, the first and third active regions include a same total number of fins, and the second and fourth active regions include a same total number of fins, positioning the third and fourth active regions causes the IC layout diagram of the cell to have equal total numbers of fins of each type, in some embodiments. In various embodiments, positioning the third and fourth active regions causes the IC layout diagram of the cell to have the total number of fins of each type equal to three, five, or seven.

In some embodiments, the IC layout diagram of the cell including the third and fourth active regions positioned as discussed above is capable of being placed in an IC layout diagram including fin tracks corresponding to the first through fourth active regions, e.g., an IC layout diagram 700 discussed below with respect to method 400 and FIGS. 4 and 7.

At operation 160, in some embodiments, the IC layout diagram is generated and stored in a storage device. Generating the IC layout diagram is performed by a processor, e.g., processor 1102 of IC layout diagram generation system 1100 discussed below with respect to FIG. 11. In some embodiments, generating the IC layout diagram includes generating some or all of IC design layout diagram 1222 discussed below with respect to FIG. 12.

In various embodiments, storing the IC layout diagram in the storage device includes storing the IC layout diagram in a non-volatile, computer-readable memory or a cell library, e.g., a database, and/or includes storing the IC layout diagram over a network. In various embodiments, storing the IC layout diagram in the storage device includes storing the IC layout diagram in cell library 1120 or over network 1114 of IC layout diagram generation system 1100, discussed below with respect to FIG. 11.

In various embodiments, generating and storing the IC layout diagram includes generating and storing one or more of IC layout diagrams 200 or 300 discussed above with respect to FIGS. 2 and 3 or IC layout diagrams 500-800 discussed below with respect to FIGS. 4-8.

At operation 170, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed below with respect to IC manufacturing system 1200 and FIG. 12.

In various embodiments, fabricating one or more semiconductor masks or at least one component in the layer of the semiconductor IC is based on one or more of IC layout diagrams 200 or 300 discussed above with respect to FIGS. 2 and 3 or IC layout diagrams 500-800 discussed below with respect to FIGS. 4-8.

In some embodiments, fabricating one or more semiconductor masks or at least one component in the layer of the semiconductor IC is part of a method 1000 of manufacturing an IC structure discussed below with respect to FIG. 10.

At operation 180, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 12.

In various embodiments, performing one or more manufacturing operations is based on one or more of IC layout diagrams 200 or 300 discussed above with respect to FIGS. 2 and 3 or IC layout diagrams 500-800 discussed below with respect to FIGS. 4-8.

In some embodiments, performing the one or more manufacturing operations is part of method 1000 of manufacturing an IC structure discussed below with respect to FIG. 10.

By executing some or all of the operations of method 100, an IC layout diagram, e.g., one of IC layout diagrams 200 or 300, is generated in which a cell includes at least one FinFET having a greater number of fins than at least one other FinFET in the cell. For a given cell height, the differing number of fins enables an increased driving ability of an associated IC device compared to approaches in which each FinFET of a cell includes a same number of fins. Further, the relative increase in the total number of fins, and thereby driving ability, is achieved without increasing cell area compared to approaches in which each FinFET of a cell includes a same number of fins.

FIG. 4 is a flowchart of a method 400 of operating an IC manufacturing system, in accordance with some embodiments. In some embodiments, operating the IC manufacturing system includes generating an IC layout diagram, e.g., an IC layout diagram 500-800 discussed below with respect to FIGS. 5-8, corresponding to an IC structure, e.g., IC structure 900 discussed below with respect to FIG. 9, manufactured based on the generated IC layout diagram as part of an IC device.

In some embodiments, some or all of method 400 is executed by a processor of a computer. In some embodiments, some or all of method 400 is executed by processor 1102 of an IC layout diagram generation system 1100, discussed below with respect to FIG. 11.

Some or all of the operations of method 400 are capable of being performed as part of a design procedure performed in a design house, e.g., design house 1220 discussed below with respect to FIG. 12.

In some embodiments, the operations of method 400 are performed in the order depicted in FIG. 4. In some embodiments, the operations of method 400 are performed simultaneously and/or in an order other than the order depicted in FIG. 4. In some embodiments, one or more operations are performed before, between, during, and/or after performing one or more operations of method 400.

FIGS. 5-8 are depictions of non-limiting examples of corresponding IC layout diagrams 500-800 generated by executing one or more operations of method 400 as discussed below, in some embodiments. IC layout diagrams 500-800 are simplified for the purpose of clarity. In various embodiments, one or more of IC layout diagrams 500-800 includes features in addition to those depicted in FIGS. 5-8, e.g., one or more transistor elements, power rails, isolation structures, wells, conductive elements, or the like. Each of FIGS. 5-8 further depicts the X and Y directions discussed above with respect to FIGS. 2 and 3.

At operation 410, a first plurality of fin tracks is arranged into a first subset having a first number of fin tracks corresponding to a first type, and a second subset having a second number of fin tracks corresponding to a second type, the first number being greater than the second number.

Arranging the first plurality of fin tracks includes arranging the first plurality of fin tracks extending in a first direction in an IC layout diagram. Fin tracks are lines in the IC layout diagram that define, at least in part, potential locations of FinFET fins and correspond to active regions usable to define p-type or n-type active areas as discussed above with respect to method 100 and FIGS. 1-3.

In various embodiments, arranging the first plurality of fin tracks includes the first subset having fin tracks corresponding to the first type being p-type fins and the second subset having fin tracks corresponding to the second type being n-type fins, or includes the first subset having fin tracks corresponding to the first type being n-type fins and the second subset having fin tracks corresponding to the second type being p-type fins.

In some embodiments, arranging the first plurality of fin tracks includes the first number of fin tracks being greater than the second number of fin tracks by one. In various embodiments, arranging the first plurality of fin tracks includes the first subset having two, three, or four fin tracks. In various embodiments, arranging the first plurality of fin tracks includes the second subset having one, two, or three fin tracks.

In some embodiments, arranging the first plurality of fin tracks includes arranging the first plurality of fin tracks corresponding to a first row of cells in the IC layout diagram.

Figure 5:
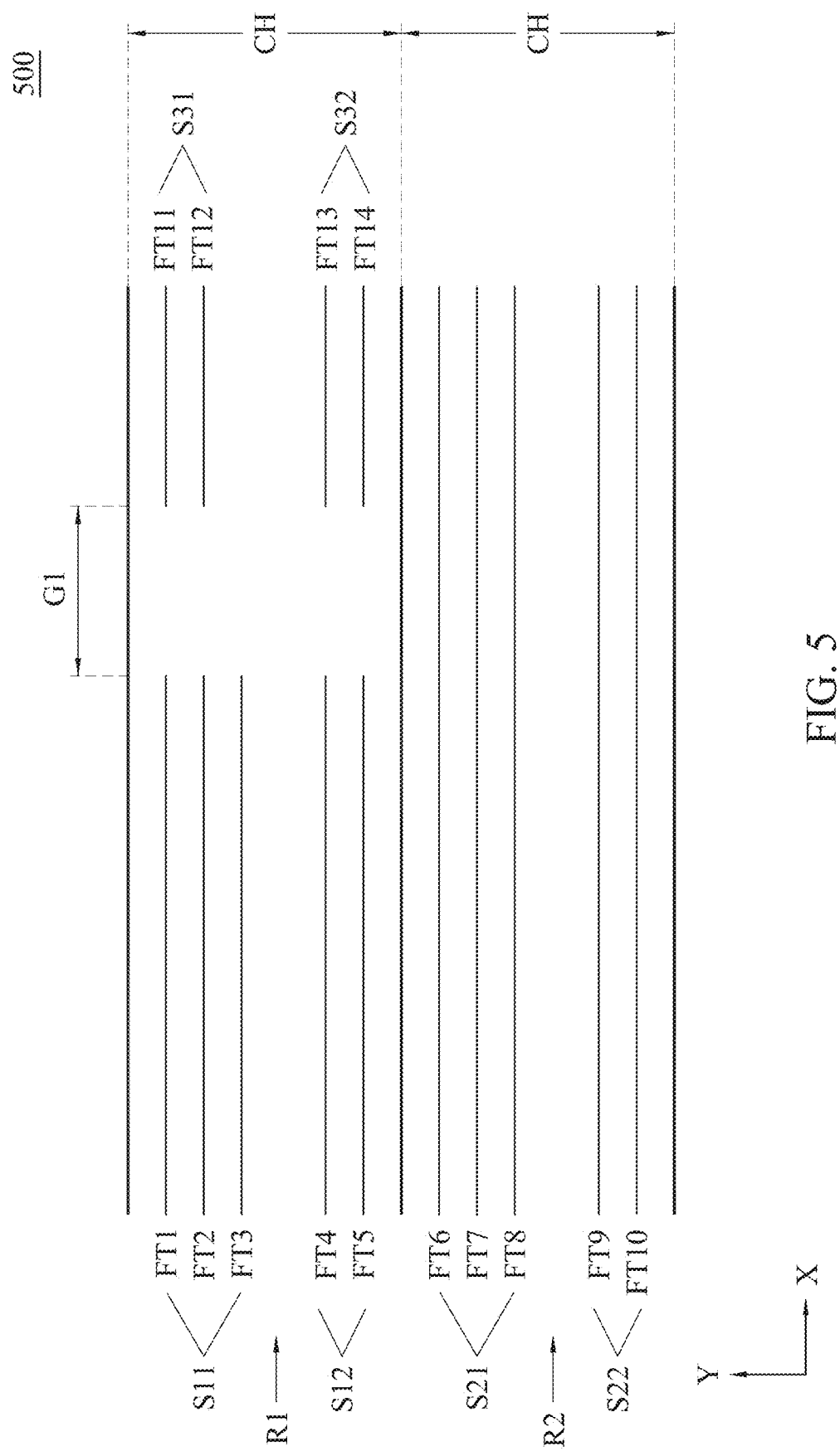
FIG. 5 depicts an IC layout diagram, in accordance with some embodiments.
Figure 7:
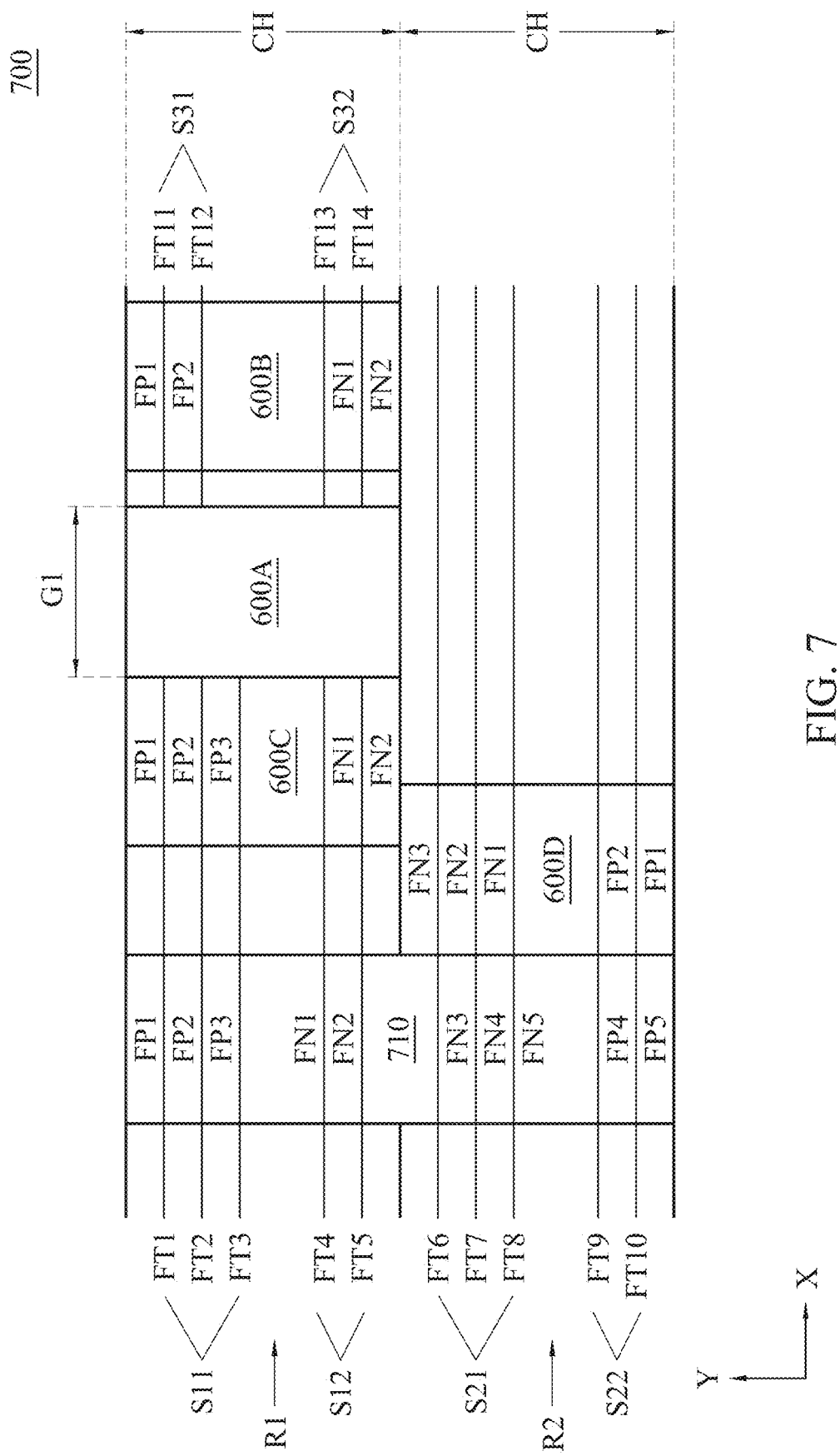
FIG. 7 depicts an IC layout diagram, in accordance with some embodiments.

In some embodiments, arranging the first plurality of fin tracks includes arranging fin tracks FT1-FT5 extending in the X direction in IC layout diagram 500 depicted in FIG. 5 and/or IC layout diagram 700 depicted in FIG. 7. Arranging fin tracks FT1-FT5 includes arranging fin tracks FT1-FT5 into first and second subsets corresponding to a subset S11 having the first number equal to three fin tracks FT1-FT3 and a subset S12 having the second number equal to two fin tracks FT4 and FT5. In various embodiments, subset S11 corresponds to the first type being p-type fins and subset S12 corresponds to the second type being n-type fins, or subset S11 corresponds to the first type being n-type fins and subset S12 corresponds to the second type being p-type fins. Arranging fin tracks FT1-FT5 includes arranging fin tracks FT1-FT5 corresponding to a row R1 having cell height CH discussed above with respect to FIGS. 1-3.

At operation 420, a second plurality of fin tracks extending in the first direction is arranged into a first subset having the first number of fin tracks corresponding to the second type, and a second subset having the second number of fin tracks corresponding to the first type. Arranging the second plurality of fin tracks includes arranging the second plurality of fin tracks in the IC layout diagram.

In some embodiments, arranging the second plurality of fin tracks includes arranging the second plurality of fin tracks corresponding to a second row of cells in the IC layout diagram.

In some embodiments, arranging the second plurality of fin tracks includes arranging fin tracks FT6-FT10 extending in the X direction in IC layout diagram 500 depicted in FIG. 5 and/or IC layout diagram 700 depicted in FIG. 7. Arranging fin tracks FT6-FT10 includes arranging fin tracks FT6-FT10 into first and second subsets corresponding to a subset S21 having the first number equal to three fin tracks FT6-FT8, and a subset S22 having the second number equal to two fin tracks FT9 and FT10. Subset S21 corresponds to the second type fins of subset S12, and subset S22 corresponds to the first type fins of subset S11. Arranging fin tracks FT6-FT10 includes arranging fin tracks FT6-FT10 corresponding to a row R2 having cell height CH.

At operation 430, the second subset of the first plurality of fin tracks is abutted with the first subset of the second plurality of fin tracks. Abutting the second subset of the first plurality of fin tracks with the first subset of the second plurality of fin tracks includes positioning a fin track of the second subset of the first plurality of fin tracks adjacent to a fin track of the first subset of the second plurality of fin tracks along a second direction perpendicular to the first direction. In some embodiments, abutting the second subset of the first plurality of fin tracks with the first subset of the second plurality of fin tracks includes abutting the first row with the second row.

Abutting the second subset of the first plurality of fin tracks with the first subset of the second plurality of fin tracks includes an area in the IC layout diagram between the first and second pluralities of fin tracks being free from including a fin track. In various embodiments, abutting the second subset of the first plurality of fin tracks with the first subset of the second plurality of fin tracks includes the area in the IC layout diagram between the first and second pluralities of fin tracks including one or more features, e.g., a conductive region corresponding to a power rail or an MD region, other than a fin track.

In some embodiments, abutting the second subset of the first plurality of fin tracks with the first subset of the second plurality of fin tracks includes abutting subset S12 with subset S21 and abutting row R1 with row R2 by positioning fin track FT5 adjacent to fin track FT6 along the Y direction as depicted in FIGS. 5 and 7.

In some embodiments, abutting the second subset of the first plurality of fin tracks with the first subset of the second plurality of fin tracks includes abutting the second subset of the second plurality of fin tracks with a first subset of an additional plurality of fin tracks along the second direction, the additional plurality of fin tracks having a same configuration as the first plurality of fin tracks.

In some embodiments, abutting the second subset of the first plurality of fin tracks with the first subset of the second plurality of fin tracks includes abutting a second subset of an additional plurality of fin tracks with the first subset of the first plurality of fin tracks along the second direction, the additional plurality of fin tracks having a same configuration as the second plurality of fin tracks.

In some embodiments, abutting the second subset of the first plurality of fin tracks with the first subset of the second plurality of fin tracks includes abutting the first and second pluralities of fin tracks with one or more additional first and second pluralities of fin tracks along the second direction, thereby arranging the first and second pluralities of fin tracks within a pattern of repeated pluralities of first and second fin tracks.

At operation 440, in some embodiments, a third plurality of fin tracks is aligned with one of the first plurality of fin tracks or the second plurality of fin tracks along the first direction. Aligning the third plurality of fin tracks includes aligning the third plurality of fin tracks having a first subset having the second number of fin tracks and being the same type as the first subset of the one of the first or second pluralities of fin tracks, and a second subset having the second number of fin tracks and being the same type as the second subset of the one of the first or second pluralities of fin tracks.

Aligning the third plurality of fin tracks includes aligning each fin track of the first subset of the third plurality of fin tracks with a corresponding fin track of the first subset of the one of the first or second pluralities of fin tracks along the first direction, and aligning each fin track of the second subset of the third plurality of fin tracks with a corresponding fin track of the second subset of the one of the first or second pluralities of fin tracks along the first direction.

Because the first subset of the third plurality of fin tracks has the second number of fin tracks less than the first number of fin tracks of the first subset of the one of the first or second pluralities of fin tracks, at least one fin track of the first subset of the one of the first or second pluralities of fin tracks does not align with a fin track of the first subset of the third plurality of fin tracks along the first direction. Aligning the first subset of the third plurality of fin tracks thereby includes generating a fin track discontinuity between the first subsets of the third plurality of fin tracks and the one of the first or second pluralities of fin tracks.

In embodiments in which the first number of fin tracks is greater than the second number of fin tracks by one, generating the fin track discontinuity includes generating the fin track discontinuity based on a single fin track of the first subset of the one of the first or second pluralities of fin tracks not aligning with a fin track of the first subset of the third plurality of fin tracks along the first direction. In some embodiments, generating the fin track discontinuity includes generating the fin track discontinuity based on more than one fin track of the first subset of the one of the first or second pluralities of fin tracks not aligning with a fin track of the first subset of the third plurality of fin tracks along the first direction.

In some embodiments, aligning the third plurality of fin tracks includes separating the third plurality of fin tracks from the one of the first or second pluralities of fin tracks by a gap. Separating the third plurality of fin tracks from the one of the first or second pluralities of fin tracks by the gap corresponds to the fin track discontinuity between the first subsets of the one of the first or second pluralities of fin tracks and the third plurality of fin tracks. In some embodiments, separating the third plurality of fin tracks from the one of the first or second pluralities of fin tracks by the gap is part of conforming to one or more manufacturing recipe rules based on the fin track discontinuity.

In some embodiments, the gap has a value ranging from 20 nm to 150 nm. In some embodiments, the gap has a value ranging from 50 nm to 100 nm.

In some embodiments, aligning the third plurality of fin tracks includes aligning fin tracks FT11-FT14 with fin tracks FT1-FT5 along the X direction in IC layout diagram 500 depicted in FIG. 5 and/or IC layout diagram 700 depicted in FIG. 7. Aligning fin tracks FT11-FT14 includes aligning fin tracks FT11-FT14 having first and second subsets corresponding to a subset S31 having the second number of two fin tracks FT11 and FT12 of the same type as subset S11, and a subset S32 having the second number of two fin tracks FT13 and FT14 of the same type as subset S12.

Aligning subset S31 with subset S11 includes aligning fin track FT11 with fin track FT1 along the X direction and aligning fin track FT12 with fin track FT2 along the X direction. Aligning subset S32 with subset S12 includes aligning fin track FT13 with fin track FT4 along the X direction and aligning fin track FT13 with fin track FT5 along the X direction. Because subset S11 has the first number of three fin tracks greater than the first number of two fin tracks of subset S31, fin track FT3 does not align with a fin track of subset S31 along the X direction, and aligning fin tracks FT11-FT14 with fin tracks FT1-FT5 generates a fin track discontinuity between subsets S11 and S31 at a gap G1.

In the non-limiting example depicted in FIGS. 5 and 7, fin track FT3 not aligning with a fin track of subset S31 corresponds to fin track FT3 aligning along the X direction with a space between subsets S31 and S32. In various embodiments, a given fin track of the first subset of the one of the first or second pluralities of fin tracks not aligning along the first direction with a fin track of the first subset of the third plurality of fin tracks, e.g., fin track FT3 not aligning with a fin track of subset S31 along the X direction, corresponds to the given fin track aligning along the first direction with a space other than a space between the first and second subsets of the third plurality of fin tracks, i.e., a space between adjacent fin tracks of the first subset of the third plurality of fin tracks or a space outside a space occupied by the first and second subsets of the third plurality of fin tracks.

In some embodiments, aligning the third plurality of fin tracks with one of the first plurality of fin tracks or the second plurality of fin tracks along the first direction includes aligning the third plurality of fin tracks with the first plurality of fin tracks along the first direction and aligning a fourth plurality of fin tracks with the second plurality of fin tracks along the first direction, each of the third and fourth pluralities of fin tracks having a same configuration as discussed above.

In some embodiments, the first and second pluralities of fin tracks are arranged within a pattern of repeated pluralities of first and second fin tracks, the third plurality of fin tracks is one of multiple third pluralities of fin tracks configured as discussed above, and aligning the third plurality of fin tracks includes aligning each of the multiple third pluralities of fin tracks with various ones of the pluralities of first and second fin tracks along the first direction.

At operation 450, in some embodiments, a cell is aligned with one of the first plurality of fin tracks, the second plurality of fin tracks, or the third plurality of fin tracks based on a cell type. Aligning the cell with the one of the first, second, or third pluralities of fin tracks includes aligning a fin configuration of the cell with the fin track arrangement of the one of the first, second, or third pluralities of fin tracks along the first direction.

In some embodiments, the cell includes a fin configuration free from including a fin, and aligning the cell with the one of the first, second, or third pluralities of fin tracks includes aligning the cell in the gap between the third plurality of fin tracks and the one of the first or second pluralities of fin tracks.

In some embodiments, aligning the cell with one of the first plurality of fin tracks, the second plurality of fin tracks, or the third plurality of fin tracks based on the cell type includes placing the cell in the IC layout diagram including the first, second, and/or third plurality of fin tracks. In some embodiments, placing the cell in the IC layout diagram is part of an automated placement and routing (APR) method as discussed below.

In some embodiments, aligning the cell with the one of the first, second, or third pluralities of fin tracks includes receiving an IC layout diagram of the cell. In some embodiments, receiving the IC layout diagram of the cell includes receiving the IC layout diagram of the cell from a cell library as discussed above with respect to method 100 and FIG. 1.

In some embodiments, aligning the cell with the one of the first, second, or third pluralities of fin tracks includes receiving one or more of IC layout diagrams 200 or 300 and aligning one or more of cells 200C or 300C, each discussed above with respect to FIGS. 1-3. In some embodiments, aligning the cell with the one of the first, second, or third pluralities of fin tracks includes generating one or more cells, e.g., one or more of cells 200C or 300C.

Figure 6:
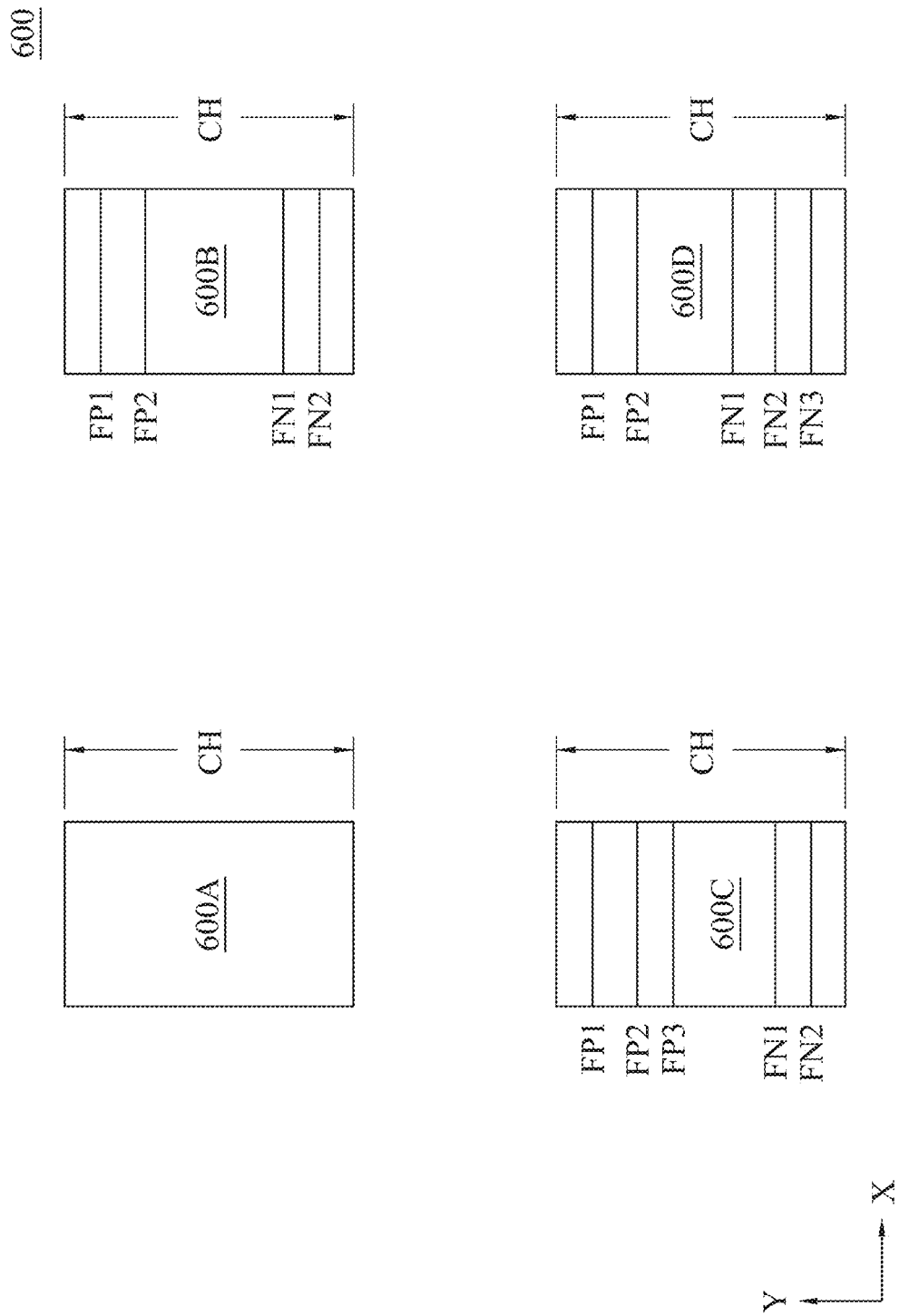
FIG. 6 depicts an IC layout diagram, in accordance with some embodiments.

In some embodiments, aligning the cell with the one of the first, second, or third pluralities of fin tracks includes aligning one or more of cells 600A-600D of an IC layout diagram 600 depicted in FIG. 6. In the embodiment depicted in FIG. 6, IC layout diagram 600 includes each of cells 600A-600D. In various embodiments, IC layout diagram 600 includes a subset of cells 600A-600D and/or one or more cells (not shown) in addition to cells 600A-600D.

As depicted in FIG. 6, each of cells 600A-600D has cell height CH discussed above with respect to FIGS. 2 and 5. Cell 600A is free from including a fin configuration and accordingly has a total number of fins equal to zero. Cell 600B has a fin configuration that includes a first subset of two p-type fins FP1 and FP2 and a second subset of two n-type fins FN1 and FN2. Cell 600C has a fin configuration that includes a first subset of three p-type fins FP1-FP3 and a second subset of two n-type fins FN1 and FN2. Cell 600D has a fin configuration that includes a first subset of two p-type fins FP1 and FP2 and a second subset of three n-type fins FN1-FN3.

In some embodiments, aligning the cell with the one of the first, second, or third pluralities of fin tracks includes aligning cells 600A-600D with pluralities of fin tracks FT1-FT5, FT6-FT10, and FT11-FT14 corresponding to rows R1 and R2 discussed above with respect to FIG. 5, in IC layout diagram 700 depicted in FIG. 7. In the embodiment depicted in FIG. 7, each of subsets S11, S22, and S31 corresponds to the p-type and each of subsets S12, S21, and S32 corresponds to the n-type.

In the embodiment depicted in FIG. 7, aligning cell 600A is based on cell 600A having zero fins and includes placing cell 600A in gap G1 between fin tracks FT1-FT5 and fin tracks FT11-FT14, thereby placing cell 600A in row R1. Aligning cell 600B includes aligning p-type fins FP1 and FP2 with respective p-type fin tracks FT11 and FT12 and aligning n-type fins FN1 and FN2 with respective n-type fin tracks FT13 and FT14, thereby placing cell 600B in row R1. Aligning cell 600C includes aligning p-type fins FP1-FP3 with respective p-type fin tracks FT1-FT3 and aligning n-type fins FN1 and FN2 with respective n-type fin tracks FT4 and FT5, thereby placing cell 600C in row R1.

Based on the configuration of cell 600D, aligning cell 600D includes inverting cell 600D with respect to the Y direction, thereby aligning n-type fins FN3-FN1 with respective fin tracks FT6-FT8 and aligning p-type fins FP2 and FP1 with respective p-type fin tracks FT9 and FT10, thereby placing cell 600D in row R2.

In the embodiment depicted in FIG. 7, aligning the cell with the one of the first, second, or third pluralities of fin tracks further includes aligning a cell 710 with fin tracks FT1-FT10 corresponding to first and second pluralities of fin tracks. Cell 710 has a configuration that includes a height (not labeled) equal to twice cell height CH, a first subset of three p-type fins FP1-FP3, a second subset of n-type fins FN1 and FN2, a third subset of three n-type fins FN3-FN5, and a fourth subset of two p-type fins FP4 and FP5.

Aligning cell 710 with the first and second pluralities of fin tracks includes aligning p-type fins FP1-FP3 with respective p-type fin tracks FT1-FT3, aligning n-type fins FN1 and FN2 with respective n-type fin tracks FT4 and FT5, aligning n-type fins FN3-FN5 with respective fin tracks FT6-FT8, and aligning p-type fins FP4 and FP5 with respective p-type fin tracks FT9 and FT10, thereby placing cell 710 in rows R1 and R2. Aligning cell 710 with the first and second pluralities of fin tracks thereby includes aligning cell 710 having a same total number (five) of p-type fins and n-type fins.

As illustrated by the non-limiting example depicted in FIG. 7, in some embodiments, the cell is one cell of a plurality of cells, and aligning the cell with the one of the first, second, or third pluralities of fin tracks includes aligning one or more cells of the plurality of cells with corresponding one or more of the first, second, or third pluralities of fin tracks. In various embodiments, the plurality of cells includes subsets corresponding to each of one or more fin configurations having zero or one or more fins, and aligning the one or more cells of the plurality of cells includes aligning each subset with a corresponding one of the one or more pluralities of fin tracks arranged as discussed above, thereby placing the plurality of cells in the IC layout diagram.

In some embodiments, the fin configuration of a given cell, e.g., one of cells 600B-600D or 710, corresponds to a cell type based on timing criteria as discussed above with respect to method 100 and FIGS. 1-3, and aligning the given cell with the one of the first, second, or third pluralities of fin tracks is thereby based on the cell type and the timing criteria.

Figure 8:
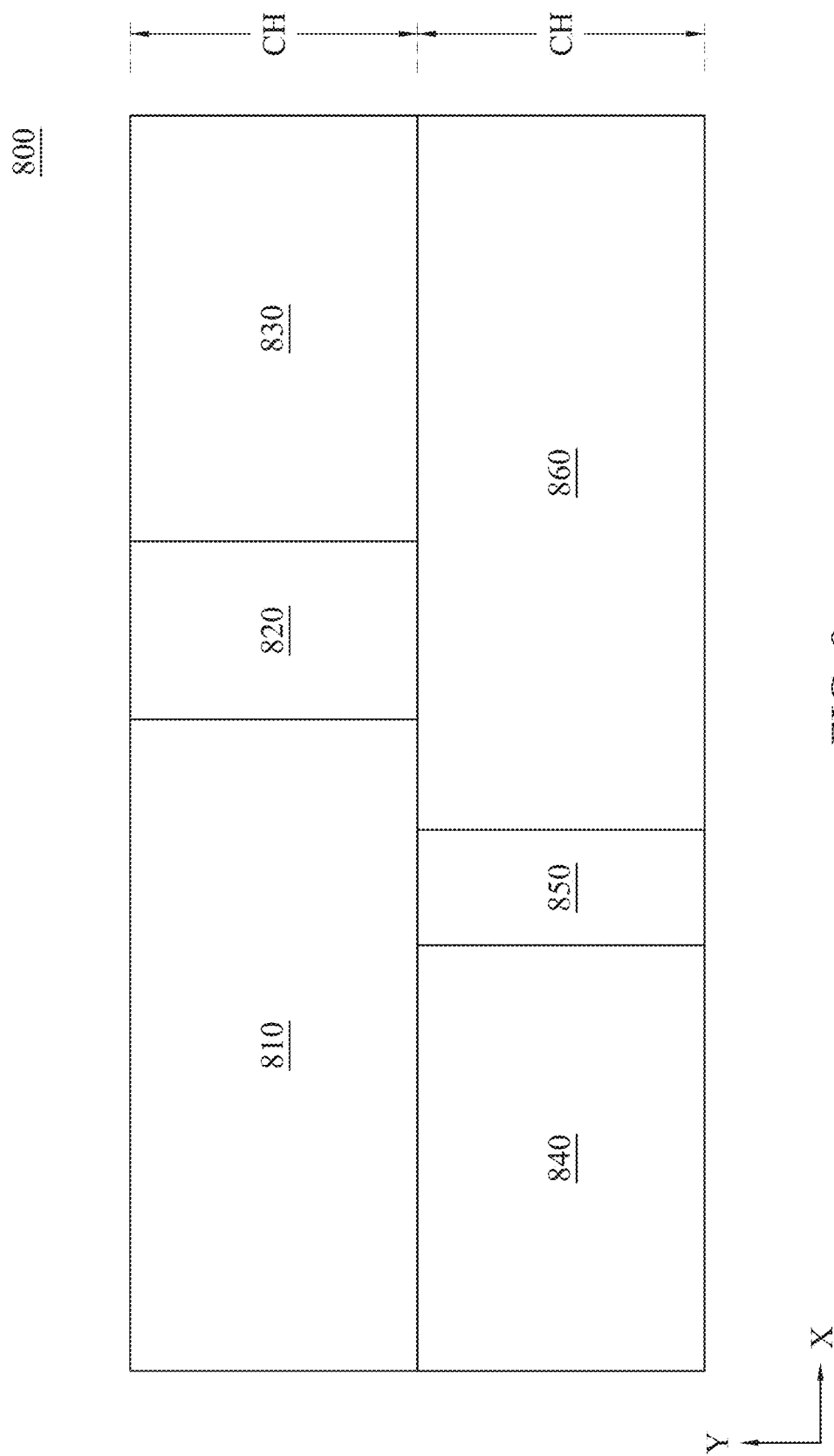
FIG. 8 depicts an IC layout diagram, in accordance with some embodiments.

In some embodiments, placing the plurality of cells in the IC layout diagram includes placing the plurality of cells in IC layout diagram 800 depicted in FIG. 8. IC layout diagram 800 includes continuous areas 810, 830, 840, and 860, and gaps 820 and 850. Continuous areas 810 and 830 have differing fin track arrangements such that a fin track discontinuity is generated at gap 820 as discussed above, and continuous areas 840 and 860 have differing fin track arrangements such that a fin track discontinuity is generated at gap 850.

In the embodiment depicted in FIG. 8, placing the plurality of cells in IC layout diagram 800 includes placing a first subset of the plurality of cells in continuous area 810 based on the fin configuration of the first subset matching the fin track arrangement of continuous area 810, placing a second subset of the plurality of cells in continuous area 830 based on the fin configuration of the second subset matching the fin track arrangement of continuous area 830, placing a third subset of the plurality of cells in continuous area 840 based on the fin configuration of the third subset matching the fin track arrangement of continuous area 840, placing a fourth subset of the plurality of cells in continuous area 860 based on the fin configuration of the fourth subset matching the fin track arrangement of continuous area 860, and placing a fifth subset of the plurality of cells in gaps 820 and 850 based on the fifth subset having a fin configuration including zero fins.

In some embodiments, some or all of aligning the cell with the one of the first plurality of fin tracks, the second plurality of fin tracks, or the third plurality of fin tracks based on a cell type, including placing the plurality of cells in the IC layout diagram, is part of an APR method performed by an APR system. In some embodiments, the APR method further includes some or all of operations 410 through 430.

In various embodiments, the APR method includes one or a combination of a constructive algorithm, an iterative algorithm, or an integrated algorithm. In a constructive algorithm, operations of placing and routing are performed on a cell-by-cell basis. After an IC layout diagram has been updated to include placement of a given cell and its associated routing connections, an additional layout diagram revision includes placement of an additional cell and its associated routing connections. In an iterative algorithm, an initial IC layout diagram including multiple cells and associated routing connections is iteratively analyzed and revised based on circuit performance and trade-off criteria. In an integrated algorithm, circuit performance and trade-off criteria are applied as an IC layout diagram is being revised to include placement of a given cell and/or its routing connections.

In various embodiments, method 400 includes one or more of operations 160-180, each discussed above with respect to method 100 and FIG. 1.

By executing some or all of the operations of method 400, an IC layout diagram, e.g., one of IC layout diagrams 500-800, is generated in which pluralities of fin tracks have an arrangement capable of supporting placement of a variety of cells, including those with FinFETs having differing numbers of fins. IC layout diagrams including the pluralities of fin tracks thereby enable the manufacture of IC devices including the increased driving ability of the cells with FinFETs having differing numbers of fins compared to approaches that do not include fin track arrangements configured to support placement of cells with FinFETs having differing numbers of fins.

Further, in the various embodiments, by executing some or all of the operations of method 400, IC layout diagrams are generated in which the pluralities of fin tracks support placement of cells in addition to those with FinFETs having differing numbers of fins, e.g., cells 600B and/or 710. The corresponding cell placement operations and resultant IC layout diagrams thereby efficiently integrate the cells including FinFETs having differing numbers of fins with those including FinFETs having the same number of fins.

Figure 9:
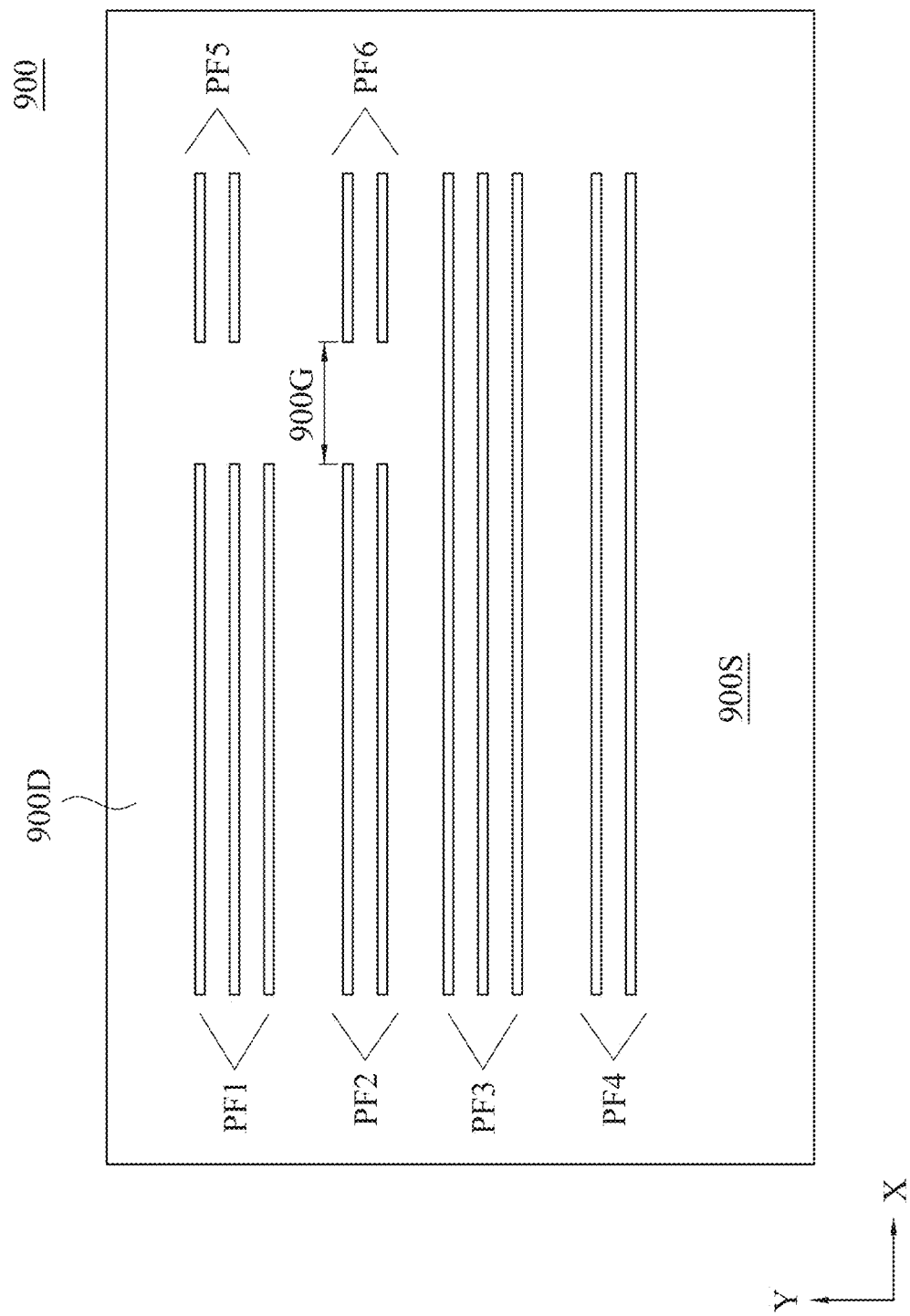
FIG. 9 is a diagram of an IC structure, in accordance with some embodiments.

FIG. 9 is a diagram of an IC structure 900, in accordance with some embodiments. IC structure 900 is formed by executing some or all of the operations of methods 100 and/or 400 and is configured in accordance with one or more of IC layout diagrams 200, 300, or 500-800, discussed above with respect to FIGS. 1-8. In some embodiments, IC structure 900 is formed in accordance with method 1000 of manufacturing an IC structure discussed below with respect to FIG. 10.

The depiction of IC structure 900 in FIG. 9 is simplified for the purpose of clarity. FIG. 9 depicts a plan view of IC structure 900 with various features included and excluded to facilitate the discussion below. FIG. 9 further depicts the X and Y directions, discussed above with respect to FIGS. 2 and 3.

As depicted in FIG. 9, IC structure 900 includes pluralities of fins PF1-PF6 located on a substrate 900S, and an IC device 900D including pluralities of fins PF1-PF6. In some embodiments, IC structure 900 does not include IC device 900D.

Each of plurality of fins PF1-PF6 includes one or more of a p-type or n-type fin extending in the X direction in an active area (not shown) in substrate 900S and configured in accordance with a FinFET manufacturing process as discussed above with respect to method 100 and FIGS. 1-3.

Plurality of fins PF1 is a first plurality of fins of a first type of the n-type or the p-type and corresponds to the first subset of the first plurality of fin tracks, e.g., subset S11 including fin tracks FT1-FT3, discussed above with respect to method 400 and FIGS. 4-7. Plurality of fins PF2 is a second plurality of fins of a second type of the n-type or the p-type, is parallel to and adjacent to plurality of fins PF1, and corresponds to the second subset of the first plurality of fin tracks, e.g., subset S12 including fin tracks FT4 and FT5 discussed above. Plurality of fins PF3 is a third plurality of fins of the second type, is parallel to and adjacent to the second plurality of fins, and corresponds to the first subset of the second plurality of fins, e.g., subset S21 including fin tracks FT6-FT8 discussed above. Plurality of fins PF4 is a fourth plurality of fins of the first type, is parallel to and adjacent to the third plurality of fins, and corresponds to the second subset of the second plurality of fin tracks, e.g., subset S22 including fin tracks FT9 and FT10 discussed above.

Plurality of fins PF1 and plurality of fins PF3 have a same first number of fins, plurality of fins PF2 and plurality of fins PF4 have a same second number of fins, and the first number is greater than the second number. In the embodiment depicted in FIG. 9, the first number of fins is equal to three and the second number of fins is equal to two. In various embodiments, one or both of the first or second number of fins have respective values other than three and four in accordance with the embodiments discussed above with respect to method 400.

In the embodiment depicted in FIG. 9, IC structure 900 includes plurality of fins PF5 and PF6. In some embodiments, IC structure 900 does not include one or both of pluralities of fins PF5 or PF6. Plurality of fins PF5 is a fifth plurality of fins of the first type and has the second number of fins. Plurality of fins PF5 corresponds to the first subset of the third plurality of fin tracks, e.g., subset S31 including fin tracks FT11 and FT12, discussed above and is accordingly aligned with a subset of first plurality of fins PF1 and separated from plurality of fins PF1 by a fin discontinuity region 900G corresponding to gap G1 discussed above with respect to FIGS. 5 and 7. Plurality of fins PF6 is a sixth plurality of fins of the second type, is parallel to and adjacent to the fifth plurality of fins, and correspond to the second subset of the third plurality of fin tracks, e.g., subset S32 including fin tracks FT13 and FT14 discussed above.

In some embodiments, IC structure 900 includes one or more pluralities of fins (not shown) in addition to plurality of fins PF1-PF4 and, in some embodiment, plurality of fins PF5 and PF6. In some embodiments, plurality of fins PF1-PF4 are included in a repeating pattern of pluralities of fins in accordance with the discussion above with respect to method 400 and FIGS. 4-8.

IC device 900D is an IC device including IC structure 900 and one or more IC features, e.g., one or more FinFETs including one or more gates, configured in accordance with one or both of method 100 and IC layout diagrams 200 and 300 discussed above with respect to FIGS. 1-3, or method 400 and IC layout diagrams 500-800 discussed above with respect to FIGS. 4-8. Details of IC device 900D are not depicted in FIG. 9 for the purpose of illustration.

Figure 10:
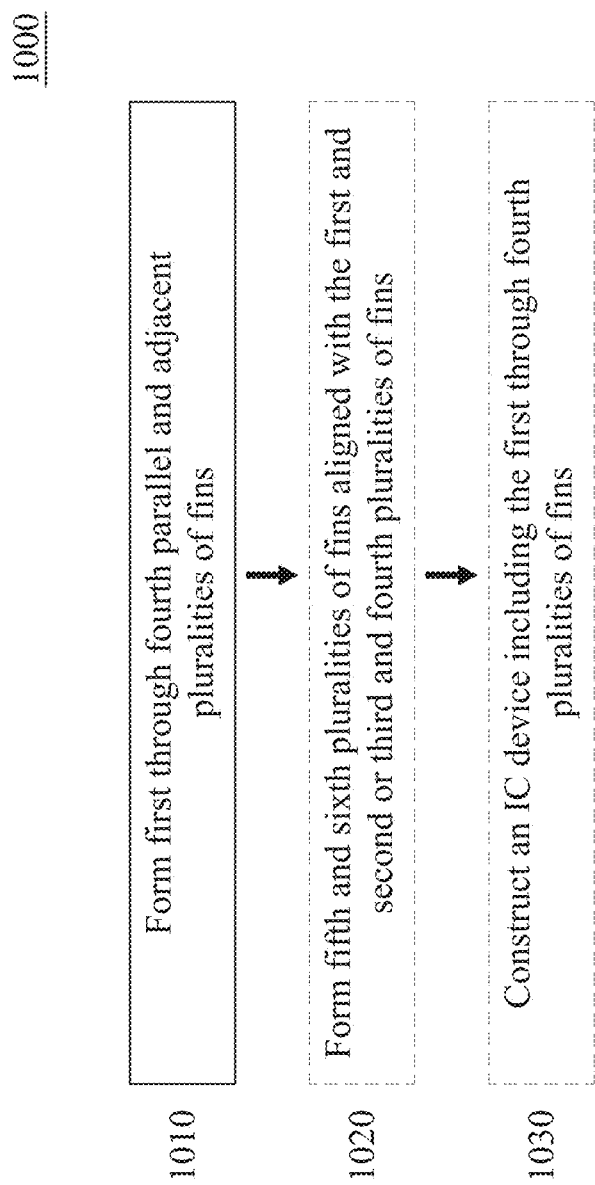
FIG. 10 is a flowchart of a method of manufacturing an IC structure, in accordance with some embodiments.

FIG. 10 is a flowchart of a method 1000 of manufacturing an IC structure, in accordance with some embodiments.

Method 1000 is operable to form an IC structure, e.g., IC structure 900 discussed above with respect to FIG. 9. In some embodiments, method 1000 is usable by an IC manufacturing system as part of an IC manufacturing flow, e.g., IC manufacturing system 1200 discussed below with respect to FIG. 12.

The sequence in which the operations of method 1000 are depicted in FIG. 10 is for illustration only; the operations of method 1000 are capable of being executed simultaneously and/or in sequences that differ from that depicted in FIG. 10. In some embodiments, operations in addition to those depicted in FIG. 10 are performed before, between, during, and/or after the operations depicted in FIG. 10.

At operation 1010, first through fourth parallel and adjacent pluralities of fins are formed. In some embodiments, forming the first through fourth parallel and adjacent pluralities of fins corresponds to forming pluralities of fins PF1-PF4 discussed above with respect to FIG. 9.

Forming a plurality of fins, e.g., one or more of plurality of fins PF1-PF4, includes using one or more suitable processes, e.g., photolithography and/or etch processes. In some embodiments, the photolithography process includes forming a photoresist layer overlying a substrate, e.g., substrate 900S, exposing the photoresist layer to a pattern, performing a post-exposure bake processes, and developing the photoresist layer to form a masking element including the photoresist layer. In some embodiments, the masking element is used to protect predetermined regions of the substrate while an etch process, e.g., a reactive ion etch, is used to form recesses in the substrate, leaving an extending fin.

At operation 1020, in some embodiments, fifth and sixth pluralities of fins are formed aligned with the first and second or third and fourth pluralities of fins. In some embodiments, forming the fifth and sixth pluralities of fins corresponds to forming pluralities of fins PF5 and PF6 discussed above with respect to FIG. 9.

At operation 1030, in some embodiments, an IC device is constructed including the first through fourth pluralities of fins. In some embodiments, constructing the IC device includes constructing IC device 900D discussed above with respect to FIG. 9.

The operations of method 1000 are usable to form an IC structure, e.g., IC structure 900, that includes first through fourth pluralities of fins arranged in accordance with method 400, and is thereby configured to have the properties, and thus the benefits, discussed above with respect to methods 100 and 400.

Figure 11:
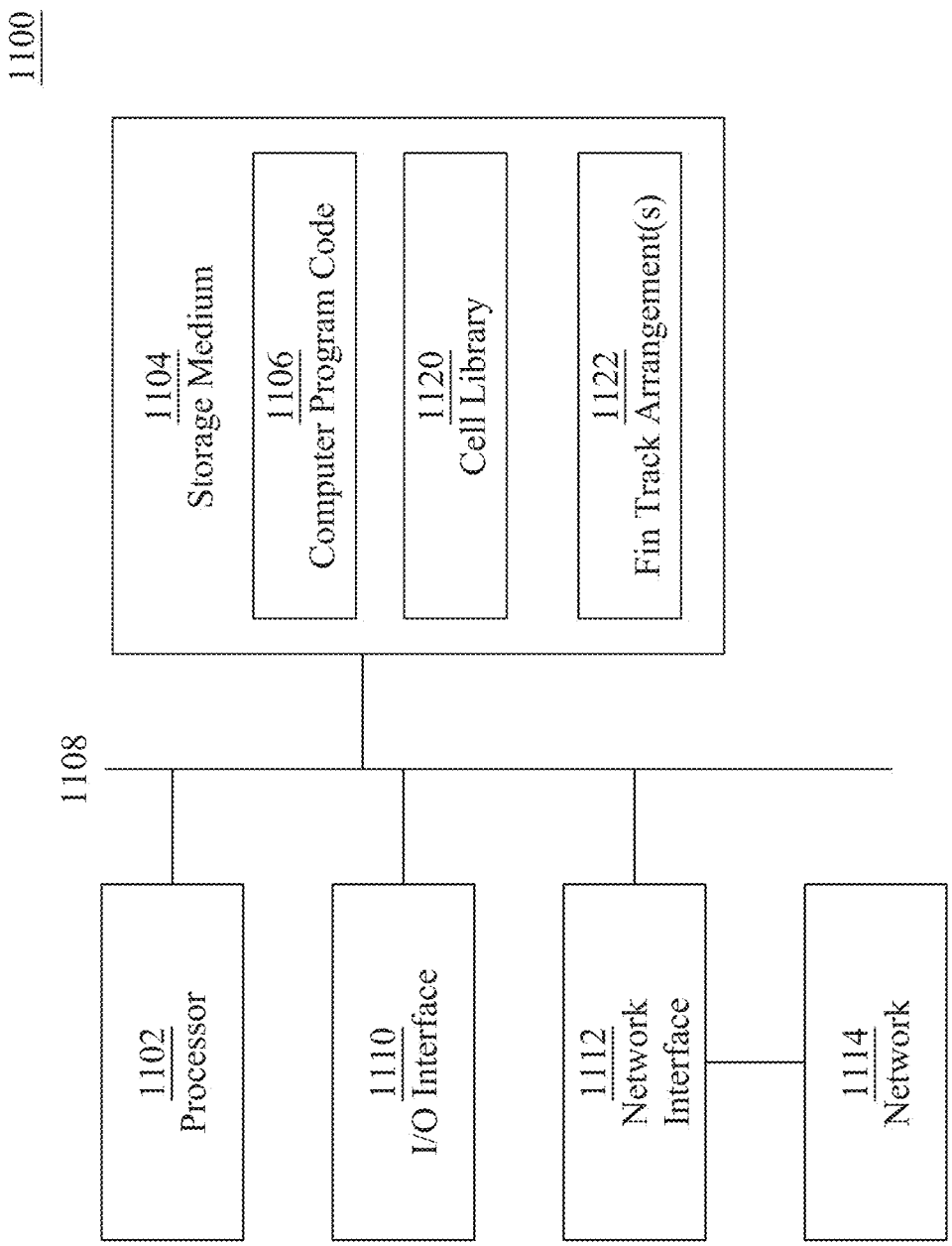
FIG. 11 is a block diagram of an IC layout diagram generation system, in accordance with some embodiments.

FIG. 11 is a block diagram of IC layout diagram generation system 1100, in accordance with some embodiments. In some embodiments, IC layout diagram generation system 1100 includes an electronic design automation (EDA). In some embodiments, IC layout diagram generation system 1100 includes or is part of an APR system. Methods described herein of designing IC layout diagrams representing fin arrangements, in accordance with one or more embodiments, are implementable, for example, using IC layout diagram generation system 1100, in accordance with some embodiments.

In some embodiments, IC layout diagram generation system 1100 is a general purpose computing device including processor 1102 and a non-transitory, computer-readable storage medium 1104. Computer-readable storage medium 1104, amongst other things, is encoded with, i.e., stores, computer program code 1106, i.e., a set of executable instructions. Execution of instructions 1106 by processor 1102 represents (at least in part) an IC layout diagram generation tool which implements a portion or all of, e.g., method 100 discussed above with respect to FIG. 1 and/or method 400 discussed above with respect to FIG. 4 (hereinafter, the noted processes and/or methods).

Processor 1102 is electrically coupled to computer-readable storage medium 1104 via a bus 1108. Processor 1102 is also electrically coupled to an I/O interface 1110 by bus 1108. A network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code 1106 encoded in computer-readable storage medium 1104 in order to cause IC layout diagram generation system 1100 to be usable for performing a portion or all of the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, computer-readable storage medium 1104 stores computer program code 1106 configured to cause IC layout diagram generation system 1100 (where such execution represents (at least in part) the IC layout diagram generation tool) to be usable for performing a portion or all of the noted processes and/or methods. In one or more embodiments, computer-readable storage medium 1104 also stores information which facilitates performing a portion or all of the noted processes and/or methods. In one or more embodiments, computer-readable storage medium 1104 stores library 1120 of standard cells including IC layout diagrams as disclosed herein, e.g., one or more of IC layout diagrams 200, 300, or 500-800 discussed above with respect to FIGS. 1-8. In one or more embodiments, computer-readable storage medium 1104 stores one or more fin track arrangements 1122 as disclosed herein, e.g., discussed above with respect to method 400 and FIGS. 4-8.

IC layout diagram generation system 1100 includes I/O interface 1110. I/O interface 1110 is coupled to external circuitry. In one or more embodiments, I/O interface 1110 includes a keyboard, keypad, mouse, trackball, trackpad, touchscreen, and/or cursor direction keys for communicating information and commands to processor 1102.

IC layout diagram generation system 1100 also includes network interface 1112 coupled to processor 1102. Network interface 1112 allows IC layout diagram generation system 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC layout diagram generation systems 1100.

IC layout diagram generation system 1100 is configured to receive information through I/O interface 1110. The information received through I/O interface 1110 includes one or more of instructions, data, design rules, libraries of standard cells, and/or other parameters for processing by processor 1102. The information is transferred to processor 1102 via bus 1108. IC layout diagram generation system 1100 is configured to receive information related to a user interface (UI) through I/O interface 1110.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC layout diagram generation system 1100. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 12:
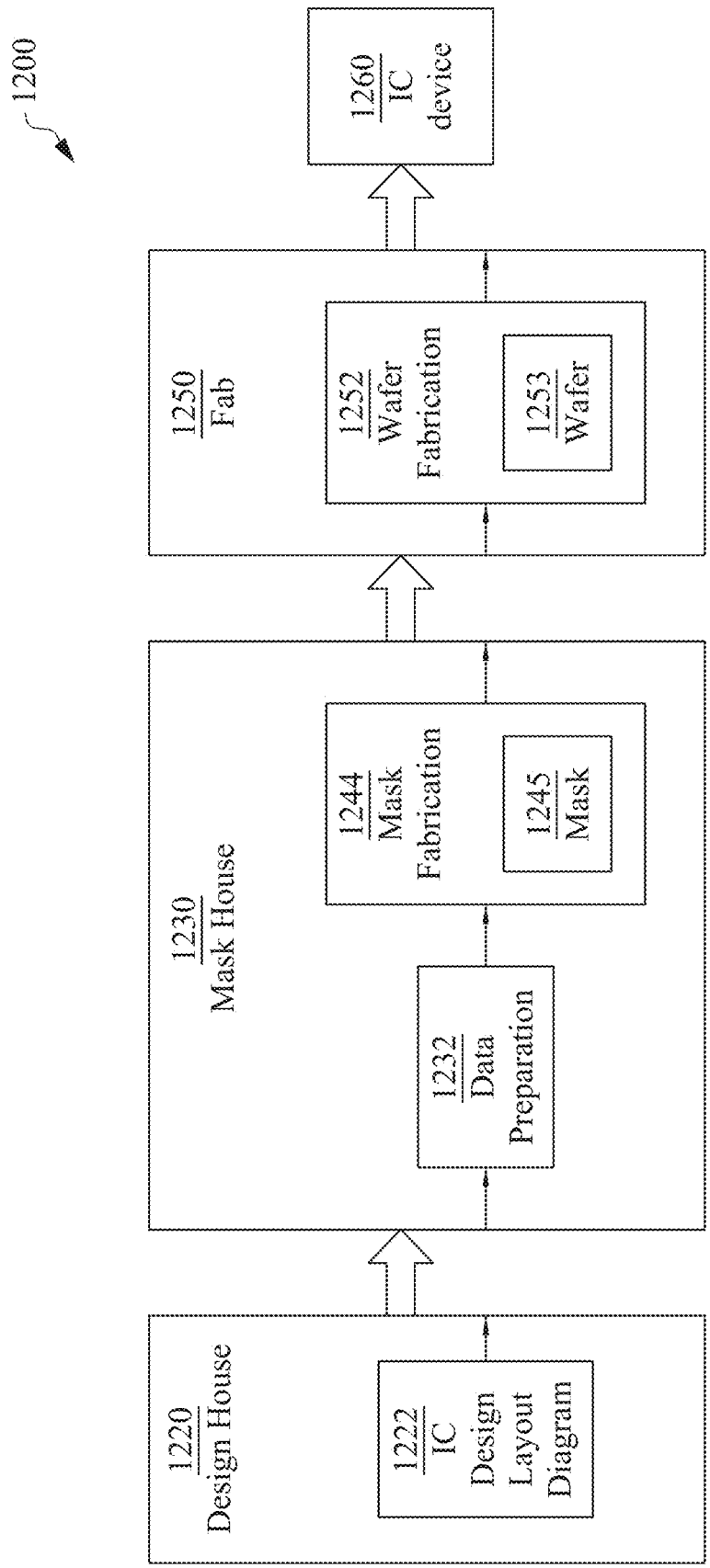
FIG. 12 is a block diagram of an IC manufacturing system, and an IC manufacturing flow associated therewith, in accordance with some embodiments.

FIG. 12 is a block diagram of IC manufacturing system 1200, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1200.

In FIG. 12, IC manufacturing system 1200 includes entities, such as a design house 1220, a mask house 1230, and an IC manufacturer/fabricator ("fab") 1250, that interact with one another in the design, development, and manufacturing cycles and/or services related to manufacturing an IC device 1260. The entities in system 1200 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1220, mask house 1230, and IC fab 1250 is owned by a single larger company. In some embodiments, two or more of design house 1220, mask house 1230, and IC fab 1250 coexist in a common facility and use common resources.

Design house (or design team) 1220 generates an IC design layout diagram 1222. IC design layout diagram 1222 includes various geometrical patterns, e.g., one or more of IC layout diagram 200, 300, or 500-800 discussed above with respect to FIGS. 1-8, designed for an IC device 1260, e.g., an IC device including IC structure 900 discussed above with respect to FIGS. 9 and 10. The geometrical patterns correspond to patterns of metal, oxide, or semiconductor layers that make up the various components of IC device 1260 to be fabricated. The various layers combine to form various IC features. For example, a portion of IC design layout diagram 1222 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1220 implements a proper design procedure to form IC design layout diagram 1222. The design procedure includes one or more of logic design, physical design, or place and route. IC design layout diagram 1222 is presented in one or more data files having information of the geometrical patterns. For example, IC design layout diagram 1222 can be expressed in a GDSII file format or DFII file format.

Mask house 1230 includes data preparation 1232 and mask fabrication 1244. Mask house 1230 uses IC design layout diagram 1222 to manufacture one or more masks 1245 to be used for fabricating the various layers of IC device 1260 according to IC design layout diagram 1222. Mask house 1230 performs mask data preparation 1232, where IC design layout diagram 1222 is translated into a representative data file ("RDF"). Mask data preparation 1232 provides the RDF to mask fabrication 1244. Mask fabrication 1244 includes a mask writer. A mask writer converts the RDF to an image on a substrate, such as a mask (reticle) 1245 or a semiconductor wafer 1253. The design layout diagram 1222 is manipulated by mask data preparation 1232 to comply with particular characteristics of the mask writer and/or requirements of IC fab 1250. In FIG. 12, mask data preparation 1232 and mask fabrication 1244 are illustrated as separate elements. In some embodiments, mask data preparation 1232 and mask fabrication 1244 can be collectively referred to as mask data preparation.

In some embodiments, mask data preparation 1232 includes optical proximity correction (OPC) which uses lithography enhancement techniques to compensate for image errors, such as those that can arise from diffraction, interference, other process effects and the like. OPC adjusts IC design layout diagram 1222. In some embodiments, mask data preparation 1232 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1232 includes a mask rule checker (MRC) that checks the IC design layout diagram 1222 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1222 to compensate for limitations during mask fabrication 1244, which may undo part of the modifications performed by OPC in order to meet mask creation rules.

In some embodiments, mask data preparation 1232 includes lithography process checking (LPC) that simulates processing that will be implemented by IC fab 1250 to fabricate IC device 1260. LPC simulates this processing based on IC design layout diagram 1222 to create a simulated manufactured device, such as IC device 1260. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1222.

It should be understood that the above description of mask data preparation 1232 has been simplified for the purposes of clarity. In some embodiments, data preparation 1232 includes additional features such as a logic operation (LOP) to modify the IC design layout diagram 1222 according to manufacturing rules. Additionally, the processes applied to IC design layout diagram 1222 during data preparation 1232 may be executed in a variety of different orders.

After mask data preparation 1232 and during mask fabrication 1244, a mask 1245 or a group of masks 1245 are fabricated based on the modified IC design layout diagram 1222. In some embodiments, mask fabrication 1244 includes performing one or more lithographic exposures based on IC design layout diagram 1222. In some embodiments, an electron-beam (e-beam) or a mechanism of multiple e-beams is used to form a pattern on a mask (photomask or reticle) 1245 based on the modified IC design layout diagram 1222. Mask 1245 can be formed in various technologies. In some embodiments, mask 1245 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1245 includes a transparent substrate (e.g., fused quartz) and an opaque material (e.g., chromium) coated in the opaque regions of the binary mask. In another example, mask 1245 is formed using a phase shift technology. In a phase shift mask (PSM) version of mask 1245, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1244 is used in a variety of processes. For example, such a mask(s) is used in an ion implantation process to form various doped regions in semiconductor wafer 1253, in an etching process to form various etching regions in semiconductor wafer 1253, and/or in other suitable processes.

IC fab 1250 includes wafer fabrication 1252. IC fab 1250 is an IC fabrication business that includes one or more manufacturing facilities for the fabrication of a variety of different IC products. In some embodiments, IC Fab 1250 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1250 uses mask(s) 1245 fabricated by mask house 1230 to fabricate IC device 1260. Thus, IC fab 1250 at least indirectly uses IC design layout diagram 1222 to fabricate IC device 1260. In some embodiments, semiconductor wafer 1253 is fabricated by IC fab 1250 using mask(s) 1245 to form IC device 1260. In some embodiments, the IC fabrication includes performing one or more lithographic exposures based at least indirectly on IC design layout diagram 1222. Semiconductor wafer 1253 includes a silicon substrate or other proper substrate having material layers formed thereon. Semiconductor wafer 1253 further includes one or more of various doped regions, dielectric features, multilevel interconnects, and the like (formed at subsequent manufacturing steps).

Details regarding an integrated circuit (IC) manufacturing system (e.g., system 1200 of FIG. 12), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S.

Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an IC device includes first through third rows of FinFETs, wherein the second row is between and adjacent to each of the first and third rows, the FinFETs of the first row are one of an n-type or p-type, the FinFETs of the second and third rows are the other of the n-type or p-type, the FinFETs of the first and third rows include a first total number of fins, and the FinFETs of the second row include a second total number of fins one greater or fewer than the first total number of fins. In some embodiments, some or all of the FinFETs of the first and second rows are configured as one or more logic gates. In some embodiments, the IC device includes a fourth row of the other of the n-type or p-type FinFETs adjacent to the third row, aligned with the second row, separated from the second row by a gap, and including the second total number of fins being one fewer than the first total number of fins, and a fifth row of the one of the n-type or p-type FinFETs adjacent to the fourth row, aligned with the first row, separated from the first row by the gap, and including the second total number of fins. In some embodiments, the fins of the FinFETs of the fifth row of FinFETs are aligned with a subset of the fins of the FinFETs of the first row of FinFETs farthest from the second row of FinFETs. In some embodiments, the gap between the first and second rows and the fourth and fifth rows spans a distance ranging from 20 nm to 150 nm. In some embodiments, the IC device includes a fourth row of FinFETs adjacent to the third row, wherein the third row is between second and fourth rows, and the FinFETs of the fourth row are the one of the n-type or p-type and include the second total number of fins. In some embodiments, the fins of the FinFETs of the first row of FinFETs are separated from corresponding fins of the FinFETs of the third row of FinFETs by a distance ranging from 100 nm to 400 nm.

In some embodiments, an IC device includes first through third rows of FinFETs, wherein the second row is between and adjacent to each of the first and third rows, the FinFETs of the first row are one of an n-type or p-type, the FinFETs of the second and third rows are the other of the n-type or p-type, the FinFETs of the first and third rows include a first total number of fins in respective first and third actives area having a first height, the FinFETs of the second row include a second total number of fins in a second active area having a second height less than the first height, and the second total number of fins is one fewer than the first total number of fins. In some embodiments, the IC device includes a fourth row of the other of the n-type or p-type FinFETs adjacent to the third row, aligned with the second row, separated from the second row by a gap, and including the second total number of fins in a fourth active area having the second height, and a fifth row of the one of the n-type or p-type FinFETs adjacent to the fourth row, aligned with the first row, separated from the first row by the gap, and including the second total number of fins in a fifth active area having the second height. In some embodiments, a distance between the fourth and fifth active areas is greater than a distance between the first and second active areas. In some embodiments, the IC device includes a sixth row of the one of the n-type or p-type FinFETs adjacent to the first and fifth rows and including fins in a sixth active area, wherein a distance between the first and sixth active areas is equal to a distance between the fifth and sixth active areas. In some embodiments, the IC device includes a fourth row of FinFETs adjacent to the third row, wherein the third row is between second and fourth rows, and the FinFETs of the fourth row are the one of the n-type or p-type and include the second total number of fins in a fourth active area having the second height. In some embodiments, the IC device includes fifth through eighth rows of FinFETs, wherein the FinFETs of the fifth row are adjacent to the FinFETs of the fourth row, are the one of the n-type or p-type, and include the first total number of fins in a fifth active area having the first height, the FinFETs of the sixth row are adjacent to the FinFETs of the fifth row, are the other of the n-type or p-type, and include the second total number of fins in a sixth active area having the second height, the FinFETs of the seventh row are adjacent to the FinFETs of the sixth row, are the other of the n-type or p-type, and include the first total number of fins in a seventh active area having the first height, and the FinFETs of the eighth row are adjacent to the FinFETs of the seventh row, are the one of the n-type or p-type, and include the second total number of fins in an eighth active area having the second height. In some embodiments, the first height has a value ranging from 45 nm to 85 nm and the second height has a value ranging from 35 nm to 50 nm.

In some embodiments, an IC device includes first through third rows of FinFETs, wherein the second row is between and adjacent to each of the first and third rows, the FinFETs of the first row are a first type of an n-type or p-type, the FinFETs of the second and third rows are a second type of the n-type or p-type, the FinFETs of the first and third rows include a total of three fins, and the FinFETs of the second row include a total of two fins. In some embodiments, some or all of the FinFETs of the first and second rows are configured as one or more of a NOR gate, a NAND gate, an AOI gate, or an OAI gate. In some embodiments, the IC device includes a fourth row of the second type of FinFETs adjacent to the third row, aligned with and separated from the second row, and including a total of two fins, and a fifth row of the first type of FinFETs adjacent to the fourth row, aligned with and separated from the first row, and including a total of two fins. In some embodiments, the two fins of the FinFETs of the fifth row are aligned with the two of the three fins of the FinFETs of the first row farthest from the FinFETs of the second row. In some embodiments, the IC device includes a fourth row of the first type of FinFETs adjacent to the third row, wherein the third row is between second and fourth rows and the FinFETs of the fourth row include a total of two fins. In some embodiments, the IC device includes fifth through eighth rows of FinFETs, wherein the FinFETs of the fifth row are adjacent to the FinFETs of the fourth row, are the first type, and include a total of three fins, the FinFETs of the sixth row are adjacent to the FinFETs of the fifth row, are the second type, and include a total of two fins, the FinFETs of the seventh row are adjacent to the FinFETs of the sixth row, are the second type, and include a total of three fins, and the FinFETs of the eighth row are adjacent to the FinFETs of the seventh row, are the first type, and include a total of two fins.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device comprising:
   first through third rows of fin field-effect transistors (FinFETs), wherein
      the second row is between and adjacent to each of the first and third rows,
      the FinFETs of the first row are one of an n-type or p-type,
      the FinFETs of the second and third rows are the other of the n-type or p-type,
      the FinFETs of the first and third rows comprise a first total number of fins, and
      the FinFETs of the second row comprise a second total number of fins one greater or fewer than the first total number of fins.

2. The IC device of claim 1, wherein some or all of the FinFETs of the first and second rows are configured as one or more logic gates.

3. The IC device of claim 1, further comprising:
   a fourth row of the other of the n-type or p-type FinFETs adjacent to the third row, aligned with the second row, separated from the second row by a gap, and comprising the second total number of fins being one fewer than the first total number of fins; and
   a fifth row of the one of the n-type or p-type FinFETs adjacent to the fourth row, aligned with the first row, separated from the first row by the gap, and comprising the second total number of fins.

4. The IC device of claim 3, wherein the fins of the FinFETs of the fifth row of FinFETs are aligned with a subset of the fins of the FinFETs of the first row of FinFETs farthest from the second row of FinFETs.

5. The IC device of claim 3, wherein the gap between the first and second rows and the fourth and fifth rows spans a distance ranging from 20 nanometers (nm) to 150 nm.

6. The IC device of claim 1, further comprising a fourth row of FinFETs adjacent to the third row, wherein
   the third row is between the second and fourth rows, and
   the FinFETs of the fourth row are the one of the n-type or p-type and comprise the second total number of fins.

7. The IC device of claim 1, wherein the fins of the FinFETs of the first row of FinFETs are separated from corresponding fins of the FinFETs of the third row of FinFETs by a distance ranging from 100 nanometers (nm) to 400 nm.

8. An integrated circuit (IC) device comprising:
   first through third rows of fin field-effect transistors (FinFETs), wherein
      the second row is between and adjacent to each of the first and third rows,
      the FinFETs of the first row are one of an n-type or p-type,
      the FinFETs of the second and third rows are the other of the n-type or p-type,
      the FinFETs of the first and third rows comprise a first total number of fins in respective first and third active areas having a first height,
      the FinFETs of the second row comprise a second total number of fins in a second active area having a second height less than the first height, and
      the second total number of fins is one fewer than the first total number of fins.

9. The IC device of claim 8, further comprising:
   a fourth row of the other of the n-type or p-type FinFETs adjacent to the third row, aligned with the second row, separated from the second row by a gap, and comprising the second total number of fins in a fourth active area having the second height; and
   a fifth row of the one of the n-type or p-type FinFETs adjacent to the fourth row, aligned with the first row, separated from the first row by the gap, and comprising the second total number of fins in a fifth active area having the second height.

10. The IC device of claim 9, wherein a distance between the fourth and fifth active areas is greater than a distance between the first and second active areas.

11. The IC device of claim 10, further comprising:
    a sixth row of the one of the n-type or p-type FinFETs adjacent to the first and fifth rows and comprising fins in a sixth active area,
    wherein a distance between the first and sixth active areas is equal to a distance between the fifth and sixth active areas.

12. The IC device of claim 8, further comprising a fourth row of FinFETs adjacent to the third row, wherein
    the third row is between the second and fourth rows, and
    the FinFETs of the fourth row are the one of the n-type or p-type and comprise the second total number of fins in a fourth active area having the second height.

13. The IC device of claim 12, further comprising fifth through eighth rows of FinFETs, wherein
    the FinFETs of the fifth row are adjacent to the FinFETs of the fourth row, are the one of the n-type or p-type, and comprise the first total number of fins in a fifth active area having the first height,
    the FinFETs of the sixth row are adjacent to the FinFETs of the fifth row, are the other of the n-type or p-type, and comprise the second total number of fins in a sixth active area having the second height,
    the FinFETs of the seventh row are adjacent to the FinFETs of the sixth row, are the other of the n-type or p-type, and comprise the first total number of fins in a seventh active area having the first height, and
    the FinFETs of the eighth row are adjacent to the FinFETs of the seventh row, are the one of the n-type or p-type, and comprise the second total number of fins in an eighth active area having the second height.

14. The IC device of claim 8, wherein
    the first height has a value ranging from 45 nanometers (nm) to 85 nm, and
    the second height has a value ranging from 35 nm to 50 nm.

15. An integrated circuit (IC) device comprising:
    first through third rows of fin field-effect transistors (FinFETs), wherein
       the second row is between and adjacent to each of the first and third rows,
       the FinFETs of the first row are a first type of an n-type or p-type,
       the FinFETs of the second and third rows are a second type of the n-type or p-type,
       the FinFETs of the first and third rows comprise a total of three fins, and
       the FinFETs of the second row comprise a total of two fins.

16. The IC device of claim 15, wherein some or all of the FinFETs of the first and second rows are configured as one or more of a NOR gate, a NAND gate, an AOI gate, or an OAI gate.

17. The IC device of claim 15, further comprising:
a fourth row of the second type of FinFETs adjacent to the third row, aligned with and separated from the second row, and comprising a total of two fins; and
a fifth row of the first type of FinFETs adjacent to the fourth row, aligned with and separated from the first row, and comprising a total of two fins.

18. The IC device of claim 17, wherein the two fins of the FinFETs of the fifth row are aligned with the two of the three fins of the FinFETs of the first row farthest from the FinFETs of the second row.

19. The IC device of claim 15, further comprising a fourth row of the first type of FinFETs adjacent to the third row, wherein
the third row is between the second and fourth rows, and
the FinFETs of the fourth row comprise a total of two fins.

20. The IC device of claim 19, further comprising fifth through eighth rows of FinFETs, wherein
the FinFETs of the fifth row are adjacent to the FinFETs of the fourth row, are the first type, and comprise a total of three fins,
the FinFETs of the sixth row are adjacent to the FinFETs of the fifth row, are the second type, and comprise a total of two fins,
the FinFETs of the seventh row are adjacent to the FinFETs of the sixth row, are the second type, and comprise a total of three fins, and
the FinFETs of the eighth row are adjacent to the FinFETs of the seventh row, are the first type, and comprise a total of two fins.

* * * * *